(12) United States Patent
Zhou et al.

(10) Patent No.: US 12,474,914 B1
(45) Date of Patent: Nov. 18, 2025

(54) CONCURRENT MACHINE LEARNING MODEL PREDICTION ON EDGE DEVICES

(71) Applicant: Amazon Technologies, Inc., Seattle, WA (US)

(72) Inventors: Chao Zhou, Fremont, CA (US); Ravish Hastantram, Fremont, CA (US); Peter Arnold Zientara, New Lenox, IL (US); Patrick Sisterhen, Georgetown, TX (US); Surya Kari, Newark, CA (US)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 18/067,203

(22) Filed: Dec. 16, 2022

(51) Int. Cl.
*G06F 9/44* (2018.01)
*G06F 8/65* (2018.01)
*G06F 9/445* (2018.01)
*G06F 9/455* (2018.01)
*G06N 20/00* (2019.01)

(52) U.S. Cl.
CPC ............... *G06F 8/65* (2013.01); *G06N 20/00* (2019.01)

(58) Field of Classification Search
CPC .................................. G06F 8/65; G06N 20/00
See application file for complete search history.

(56) References Cited

U.S. PATENT DOCUMENTS

| | | | |
|---|---|---|---|
| 7,480,907 B1 | 1/2009 | Marolia et al. | |
| 10,963,810 B2 * | 3/2021 | Dirac | ...................... G06N 20/00 |
| 11,182,691 B1 * | 11/2021 | Zhang | ...................... G06N 20/20 |
| 11,301,762 B1 * | 4/2022 | Chen | ...................... G06N 5/027 |
| 11,516,311 B2 | 11/2022 | Klein et al. | |
| 2016/0078361 A1 * | 3/2016 | Brueckner | .............. H04L 67/10 |
| | | | 706/12 |
| 2016/0217388 A1 | 7/2016 | Okanohara et al. | |
| 2018/0032915 A1 | 2/2018 | Nagaraju et al. | |
| 2019/0087239 A1 * | 3/2019 | Adibowo | ............... G06N 20/20 |
| 2019/0139441 A1 | 5/2019 | Akella et al. | |
| 2019/0220783 A1 * | 7/2019 | Nookula | ............... G06F 9/5044 |
| 2019/0251469 A1 | 8/2019 | Wagstaff et al. | |
| 2019/0370687 A1 * | 12/2019 | Pezzillo | .................. H04L 67/10 |
| 2020/0349465 A1 | 11/2020 | Hechtman | |

(Continued)

FOREIGN PATENT DOCUMENTS

CN        114661455 A   *   6/2022        ............. G06N 20/00

OTHER PUBLICATIONS

Nikita Kotsehub, FLoX: Federated Learning with FaaS at the Edge, 2022, pp. 1-10. https://ieeexplore.ieee.org/stamp/stamp.jsp?tp=&arnumber=9973578 (Year: 2022).*

(Continued)

*Primary Examiner* — Mongbao Nguyen
(74) *Attorney, Agent, or Firm* — Nicholson De Vos Webster & Elliott LLP

(57) ABSTRACT

In some examples, a method includes receiving a request to load a first machine learning model on an edge device, wherein the request includes an external identifier of the first machine learning model. The method further includes loading at least one instance of the first machine learning model onto the edge device, wherein the first machine learning model is loaded into a model pool having at least a second machine learning model using the same external identifier as the first machine learning model.

20 Claims, 30 Drawing Sheets

(56) References Cited

U.S. PATENT DOCUMENTS

| | | | |
|---|---|---|---|
| 2021/0064941 A1 | 3/2021 | Khan et al. | |
| 2021/0157312 A1 | 5/2021 | Cella et al. | |
| 2021/0201526 A1 | 7/2021 | Moloney et al. | |
| 2021/0232981 A1* | 7/2021 | Sundaresan | H04L 63/0823 |
| 2021/0312277 A1 | 10/2021 | Prabhudesai et al. | |
| 2021/0334629 A1 | 10/2021 | Yuan et al. | |
| 2022/0012012 A1 | 1/2022 | Langhammer et al. | |
| 2022/0091837 A1* | 3/2022 | Chai | G06F 8/36 |
| 2022/0092480 A1* | 3/2022 | Mahadik | G06N 20/10 |
| 2022/0108035 A1* | 4/2022 | Mehta | G06N 20/00 |
| 2022/0129785 A1* | 4/2022 | Vogeti | G06N 20/00 |
| 2022/0129787 A1* | 4/2022 | Vogeti | G06N 20/00 |
| 2022/0180178 A1* | 6/2022 | Tasinga | G06F 9/5011 |
| 2022/0343137 A1 | 10/2022 | Surendran et al. | |
| 2022/0366302 A1* | 11/2022 | Gilad | G06F 40/00 |
| 2022/0382539 A1* | 12/2022 | Gumashta | G06N 20/00 |
| 2022/0382601 A1* | 12/2022 | Feldman | G06F 9/5083 |
| 2022/0405619 A1* | 12/2022 | Ramamurthy | G06F 16/9024 |
| 2023/0068386 A1 | 3/2023 | Akdeniz et al. | |
| 2023/0370476 A1* | 11/2023 | Bakshi | H04L 63/1433 |
| 2023/0409876 A1 | 12/2023 | Agrawal et al. | |
| 2024/0119003 A1* | 4/2024 | Tobkin | G06F 12/0842 |
| 2024/0135241 A1* | 4/2024 | Yang | G06N 5/04 |

OTHER PUBLICATIONS

Pierrick Pochelu, An efficient and flexible inference system for serving heterogeneous ensembles of deep neural networks, 2021, pp. 1-8. https://ieeexplore.ieee.org/stamp/stamp.jsp?tp=&arnumber=9671725 (Year: 2021).*

English translation, Guim (CN 114661455 A), 2022, pp. 1-15. (Year: 2022).*

Chen, Zhuo, et al. "An empirical study of latency in an emerging class of edge computing applications for wearable cognitive assistance." Proceedings of the Second ACM/IEEE Symposium on Edge Computing. 2017. pp. 1-14 (Year: 2017).

Notice of Allowance, U.S. App. No. 18/067,171, Nov. 25, 2024, 11 pages.

Qolomany, Basheer, et al. "Leveraging machine learning and big data for smart buildings: A comprehensive survey." IEEE access 7 (2019): pp. 90316-90356. (Year: 2019).

Wang, Jin, et al. "Fast adaptive task offloading in edge computing based on meta reinforcement learning." IEEE Transactions on Parallel and Distributed Systems 32.1 (2020): pp. 242-253. (Year: 2020).

Chen, Jiasi, and Xukan Ran. "Deep learning with edge computing: A review." Proceedings of the IEEE 107.8 (2019): pp. 1655-1674. (Year: 2019).

Duc, Thang Le, et al. "Machine learning methods for reliable resource provisioning in edge-cloud computing: A survey." ACM Computing Surveys (CSUR) 52.5 (2019): pp. 1-39. (Year: 2019).

Li, En, Zhi Zhou, and Xu Chen. "Edge intelligence: On-demand deep learning model co-inference with device-edge synergy." Proceedings of the 2018 workshop on mobile edge communications. 2018. pp. 31-36 (Year: 2018).

Li, He, Kaoru Ota, and Mianxiong Dong. "Learning IoT in edge: Deep learning for the Internet of Things with edge computing." IEEE network 32.1 (2018): 96-101. (Year: 2018).

Li, Tian, et al. "Ease, ml: Towards multi-tenant resource sharing for machine learning workloads." Proceedings of the VLDB Endowment 11.5 (2018): pp. 607-620. (Year: 2018).

Non-Final Office Action, U.S. App. No. 18/067,171, Jun. 10, 2024, 26 pages.

Notice of Allowance, U.S. App. No. 18/067,171, Aug. 21, 2024, 13 pages.

Xu, Dianlei, et al. "Edge intelligence: Empowering intelligence to the edge of network." Proceedings of the IEEE 109.11 (2021): pp. 1778-1837. (Year: 2021).

Non-Final Office Action, U.S. Appl. No. 18/067,231, Jun. 30, 2025, 27 pages.

Visengeriyeva, Larysa, Kammer Kammer, Isabel Bar, Alexander Kniesz, and Michael Plod. "ML-Ops.Org." ML Ops: Machine Learning Operations, Dec. 2, 2020. https://ml-ops.org/content/three-levels-of-ml-software. (Year: 2020).

\* cited by examiner

```
"DEFINITIONS": [
    {
        "S3URL":"TEST_MODELS/TVM1_10_0/RESNET.TAR.GZ",
        "CHECKSUM": {
            "SUM": "1F3567809BB20A332C504A096C",
            "TYPE": "SHA1"
        },
        "MODELHANDLE": "RESNET18",
        "CHILD": ["RESNET_2", "MOBILENETV1"]
    },
    {
        "S3URL":"TEST_MODELS/TVM1_10_0/SSD-512-MOBILENET.TAR.GZ",
        "CHECKSUM": {
            "SUM": "CEEC93ED088AF9CDT1FCFB8F",
            "TYPE": "SHA1"
        },
        "MODELHANDLE": "MOBILENETV1",
    },
    {
        "S3URL":"TEST_MODELS/TVM1_10_0/RESNET.TAR.GZ",
        "CHECKSUM": {
            "SUM": "1F3567809BB20A332C504A096C",
            "TYPE": "SHA1"
        },
        "MODELHANDLE": "RESNET18"_2,
        "CHILD": ["MOBILENETV1_2"]
    },
    {
        "S3URL":"TEST_MODELS/TVM1_10_0/SSD-MOBILENET-V2.TAR.GZ",
        "CHECKSUM": {
            "SUM": "D47E8D7692D9B45F49D6F",
            "TYPE": "SHA1"
        },
        "MODELHANDLE": "MOBILENETV2",
    },
    {
        "S3URL":"TEST_MODELS/TVM1_10_0/SSD-MOBILENET-V2.TAR.GZ",
        "CHECKSUM": {
            "SUM": "D47E8D7692D9B45F49D6F",
            "TYPE": "SHA1"
        },
        "MODELHANDLE": "MOBILENETV2_2",
    },
```

FIG. 22

CONCURRENT MACHINE LEARNING MODEL PREDICTION ON EDGE DEVICES

BACKGROUND

Many machine learning (ML) use cases require running ML models on a fleet of edge devices, which allows for predictions in (near) real-time, preserves the privacy of the end users, and lowers the cost of network connectivity. With the increasing availability of low-power edge hardware designed for ML, it is now possible to run multiple complex neural network models on edge devices.

BRIEF DESCRIPTION OF DRAWINGS

Various examples in accordance with the present disclosure will be described with reference to the drawings, in which:

FIG. 22 illustrates an of at least part of a JSON configuration file.

DETAILED DESCRIPTION

Figure 1:
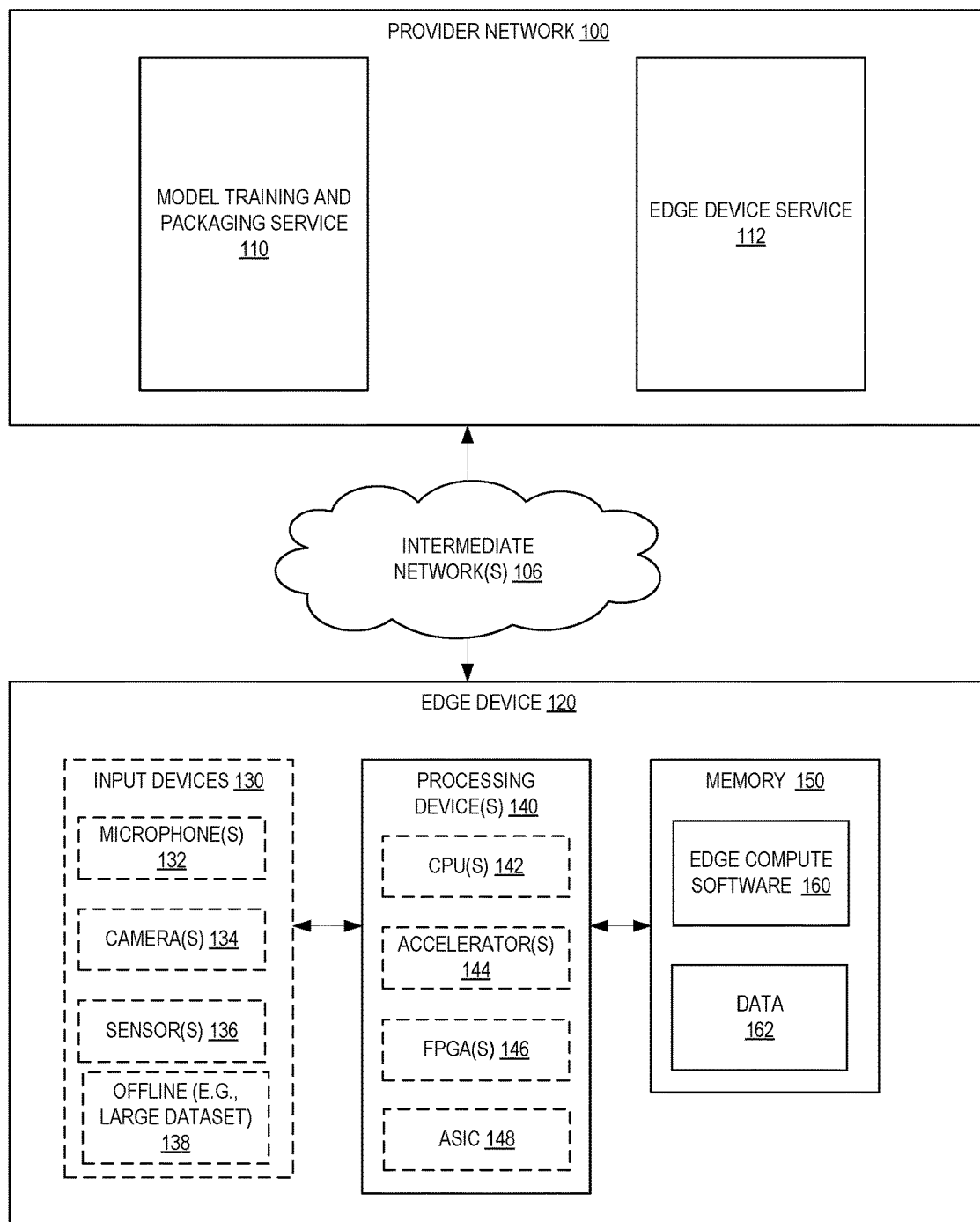
FIG. 1 illustrates examples of at least examples of an edge device supporting the use of an edge manager.

The present disclosure relates to methods, apparatus, systems, and non-transitory computer-readable storage media for handling inference on an edge device. An edge device is a device running a machine learning model for inference. An edge device may be a physical device, a virtual machine running on one or more physical machines, bare metal, etc. Unfortunately, operating ML models on edge devices may be challenging, because many edge devices, unlike cloud instances, have limited compute, memory, and connectivity. After the model is deployed, there is typically the need to continuously monitor the models as model drift can cause the quality of model to decay over time. Monitoring models across a device fleet is difficult because of the need to write custom code to collect data samples from a device and recognize skew in predictions. In addition, models are often hard-coded into the application—that is prediction (inference) requests made to a model from application are hard-coded and a change in the path, name, etc. of the model requires an update to the application itself. To update a model, one must rebuild and update the entire application or device firmware, which disrupts operations.

Model updates come in different flavors. In some examples, only weights are updated to attempt to improve the accuracy of a model. The "update" typically involves retraining an existing model that might be already deployed to the edge and might be already running inference. The existing model is fine-tuned which involves training the model with new data, being recompiled, and redeployed to the edge. There are no changes to the model architecture, input parameters, or output of the model. Only the model parameters are updated. This is typically done with some amount of frequency. This update should be as non-disruptive to the rest of the customer application as possible. That is the model updates are decoupled from any application update. This means that the model update at the edge device should be completely transparent to the application. The customer application should be able to keep invoking the same application programming interface (API) with the same parameter while the model gets updated with new weights (but keep the same architecture).

In other examples, the model architecture (including associated weights) is updated. This is a more involved model update. It involves updating the entire model architecture. This is a more involved change as it often requires newer parameters, and the model outputs could be different as well. Customer applications need to change to accommodate the new model input parameters and new model outputs. Since it is an entirely new model type, customer applications often change with the model as well. Typically, such deployments require co-coordinating both the model and the application update together. Therefore, there is no requirement that the updated model be able to call the same API with the same input parameters.

Described herein are examples of an edge manager (deployed on an edge device), that allows for the optimization, running, monitoring, and/or updating machine learning models across fleets of devices at the edge without the need for changing the application itself.

FIG. 1 illustrates examples of at least examples of an edge device supporting the use of an edge manager. The edge device 120 includes an edge deployment manager that is a part of the edge compute software 160 stored in memory 150. The edge compute software 160 (detailed later) also includes models and/or runtimes. Data 162 for the models and/or runtimes may be stored in memory 150 too. In some examples, edge deployment manager that performs one or more of: handling inference requests using one or more loaded models, collecting metrics and capturing data, load models, unloads models, etc.

The edge device 120 includes one or more processing devices 140. Examples of such devices include, but are not limited to one or more of one or more central processing units (CPUs) 142, one or more accelerators 144 (e.g., graphical processing units, tensor units, APUs, matrix units, etc.), one or more application specific integrated circuits (ASICs), and/or one or more field programmable gate arrays (FPGAs) 146. Note that accelerators can be implemented in an ASIC. Additionally, in some examples, the edge device 120 is a system-on-a-chip.

The edge device 120 includes one or more input device 130 in some examples. Input devices include, but are not limited to microphones 132, cameras (still or motion) 134, offline data (e.g., a large dataset) 138, and one or more sensors 136 (e.g., accelerometers, motion, etc.).

In some examples, the edge device 120 is coupled to a provider network 100 (or, "cloud" provider network) that provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. In some examples, the provider network 100 provides a model training and packaging service 110 used to train machine learning models and package them for use on the edge device 120 and/or an edge device service 112 that may be used to interact with the edge device 120 via one or more API calls. Note that API calls may be used to directly interact with the edge device 120 or indirectly via the edge device service 112. In some examples, the edge device 112 has an understanding of the edge device's 120 capabilities (e.g., memory, processing capabilities, location, etc.) and current status (e.g., how busy it is).

These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of API calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

Figure 2:
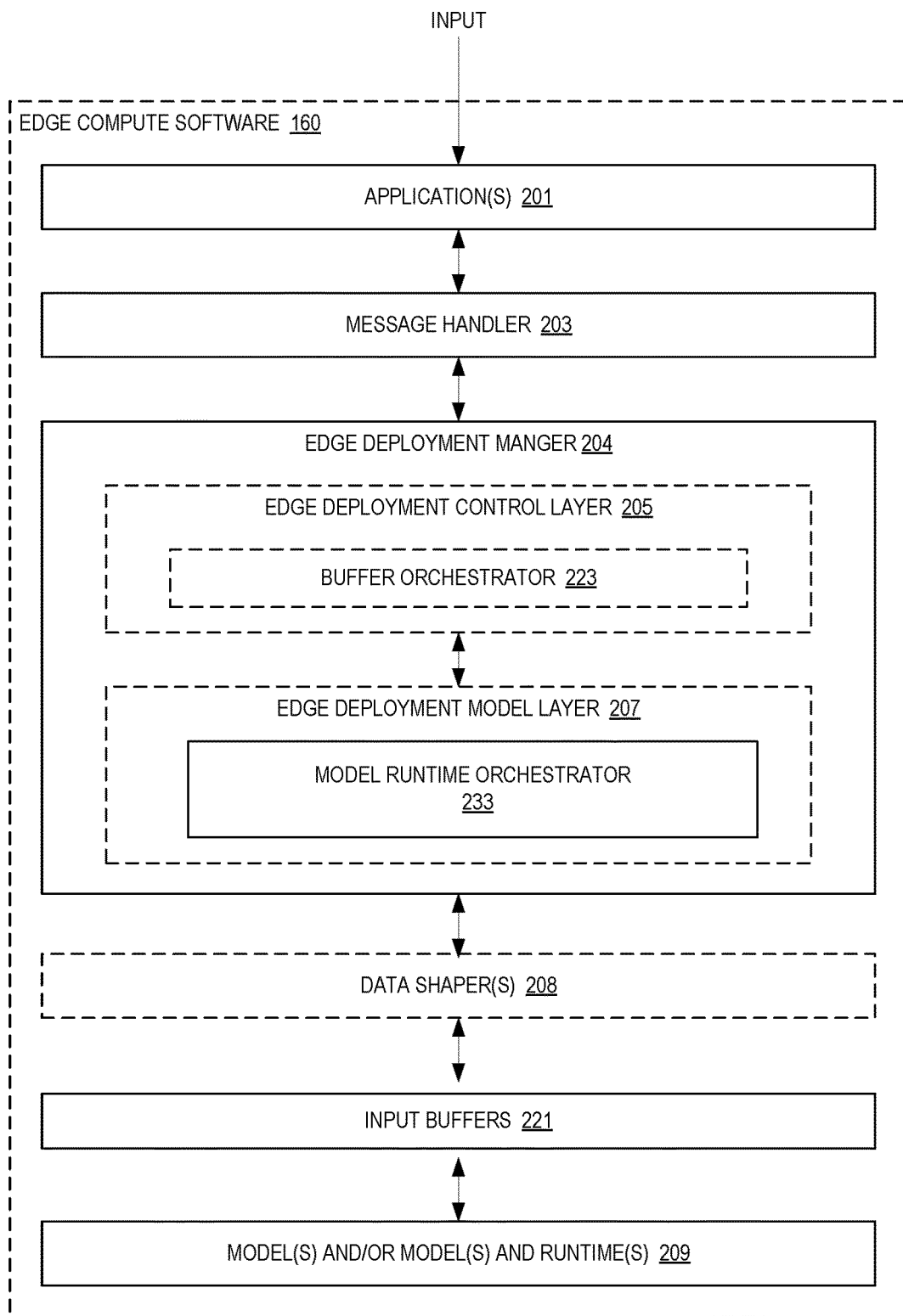
FIG. 2 illustrates at least examples of edge compute software.

FIG. 2 illustrates at least examples of edge compute software. In some examples, this illustrates edge compute software 160 of FIG. 1. As shown, one or more applications 201 receive(s) input to process. This may include user input, input from one or more input devices (such as input devices 130), etc. The application(s) 201 at some point will call for inference to be performed by at least one machine learning model and/or model(s) and runtime(s) 209. This call may be based at least in part of received input. For example, an object detection application may receive an image from a camera 134, ask that an object detection model detect one or more objects, and then provide a result of the detection to a user, etc.

In some examples, a message handler 203 is used to service messages to/from one or more ML models and/or model(s) and runtime(s) 209 and one or more applications 201. In some examples, the message handler uses a remote procedure call (RPC) framework. In some examples, the RPC framework exposes a local, in-process function that implements a business operation, and that local function invokes another function on a remote location (here a model and/or model and runtime). As such, the application 201 makes what appears to it to be a local call essentially becomes a transparent out-of-process call to a model and/or model and runtime.

An edge deployment manager 204 manages models and/or models and runtimes 209 and inputs (e.g., data 162) to them. For example, the edge deployment manager 204 can load multiple models at a time and perform inferencing with loaded models. A number of models the edge deployment manager 204 can load is determined by an available memory on the device.

In some examples, the edge deployment manager 204 implements a control layer 205 and a model layer 207. The control layer 205 handles inputs from one or more applications and maintains one or more input buffers 221 used to batch requests and/or queue requests for a particular model of a plurality of models. Batching is a machine learning model and machine learning hardware accelerator strategy where multiple samples are aggregated into one prediction API call to oversubscribe underlying processing hardware in order to get better throughput. In some examples, the size of an input buffer is determined from a model's definition. In some examples, a size of an input buffer is provided by a user.

In some examples, a buffer orchestrator 223 maintains the input buffer(s) 221. This maintenance may include one or more of determining a size of input buffer(s) 221, determining a number of buffers to include (e.g., one per model, one per batch, etc.), a size of a batch to buffer (e.g., user provided or determined by evaluating one or more models, filling the input buffer(s) 221, etc.).

To get the best performance, in some examples the buffer orchestrator 223 uses one or more buffers to batch requests. If an input size is smaller than the buffer, padding can be used to fill the remaining buffer in some examples. In some examples, the buffer orchestrator 223 loops through inputs and fills in one or more buffers based on the batch size.

Some models support dynamic batch sizes (maximum, minimum, and optimal) whereas others use a defined static batch size. In some examples, the batch size is set by a user request. In some examples, the batch size is determined using one or more of information from a model or models (e.g., an expected input size of a given model), a user defined latency, memory available, processing resources available for the model(s) and/or model(s) and runtime(s).

In some examples, input data (such as input tensors) output from an application 201 is shaped using one or more data shaper(s) 208 to generate data that is expected by a given model. Note that same input data from an application 201 may be shaped differently if being sent to different models or model variants.

The input buffer(s) 221 may be shared amongst models and/or models and runtimes by using copying or using shared memory. With copying, the edge deployment manager 204 makes copies the data or shaped data into multiple input buffers(s) 221.

Figure 3:
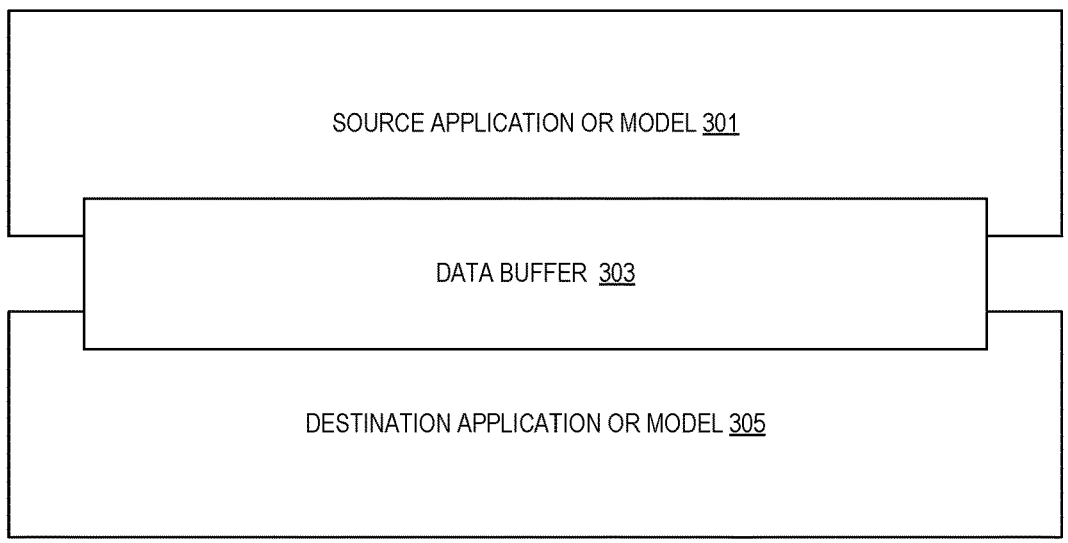
FIG. 3 illustrates examples of using shared memory.

With shared memory, an output from one entity (e.g., an application 201) is the input for another entity. That is the same physical memory space is used for both. FIG. 3 illustrates examples of using shared memory. In particular, a source application or model 301 shares a data buffer 303 with a destination application or model 305. As such, different data buffers do not need to be allocated for each application or model. This saves memory which may be limited in an edge device.

Figure 4:
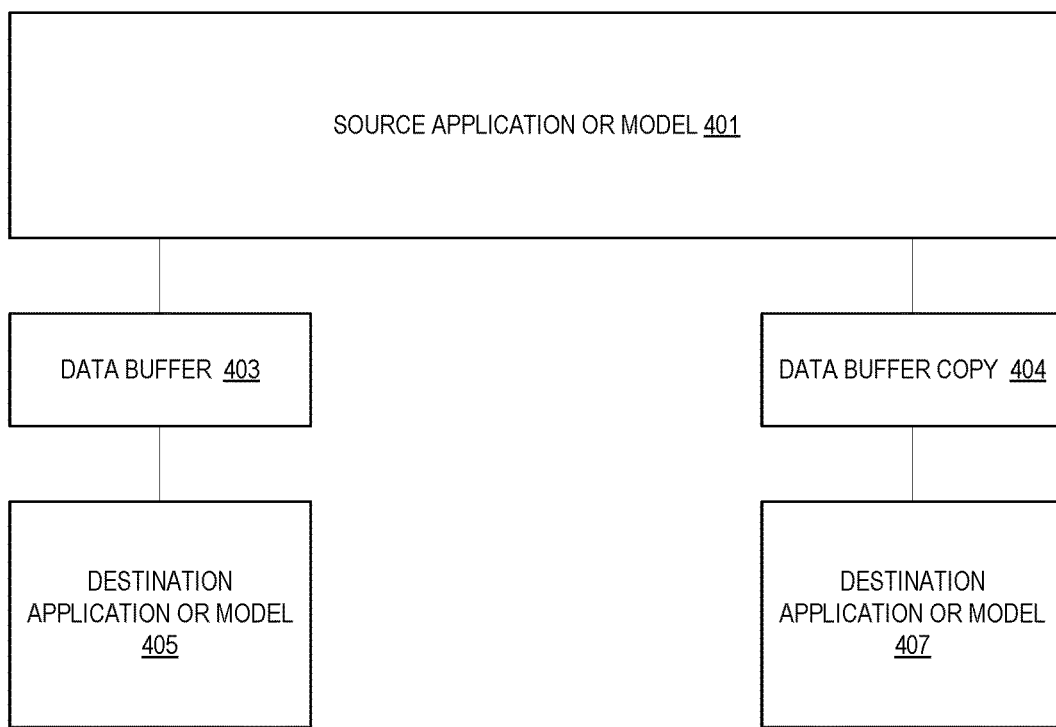
FIG. 4 illustrates examples of using buffer copies.

FIG. 4 illustrates examples of using buffer copies. In particular, a source application or model 401 outputs to a data buffer 403 and that data is copied to data buffer 404 (or the source application or model 401 writes to both data buffers 403 and 404) per a destination application or model 405 or 407. As such, different data buffers do not need to be allocated for each application or model. This saves memory which may be limited in an edge device.

In some examples, data from the buffers is copied to a runtime's buffer.

Note that while copied or shared input and output tensors may be different. For example, an input to a model may require additional data, etc.

Note that there may be input and output buffers. Prediction results are copied from runtime buffers to a buffer allocated by the edge deployment manager 204.

A normal model operation follows Load Model→Multiple Predictions→Unload Model pattern. In this pattern, the runtime orchestrator 233 handles translation of requests to the model layer 207 to underlying runtime application programming interfaces (APIs) and handles system-wide control information like one or more of model life cycle, model pool(s), and/or mapping between models and prediction API calls.

Figure 5:
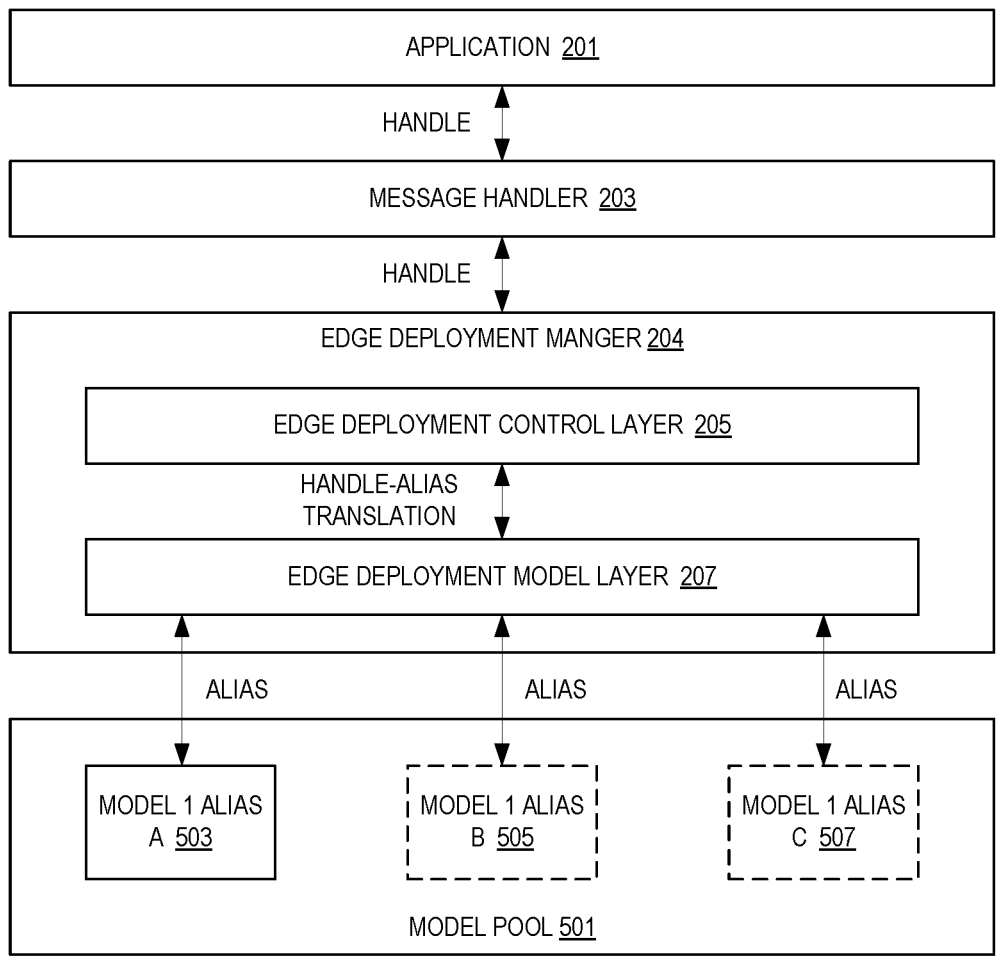
FIG. 5 illustrates examples of using aliases and a model pool.

In some examples, a model pool is used. That is models are grouped into pools indexed by model handles and prediction API calls are handled by individual models from a pool. The number of instantiated instances of a given model may change depending upon need and/or resource availability. Inside the pool, different instances are indexed by a model alias. In some examples, an initial size of a pool is one by default FIG. 5 illustrates examples of using aliases and a model pool. Models and/or models and runtimes have at least a handle (e.g., external name) and, in some examples, also have an alias (internal name). As shown, an application 201 typically uses a handle to call a model. The edge deployment manager 204 performs a handle to alias translation to route a prediction API call to the proper alias (e.g., model 1, alias A 503; model 1, alias B 505; and/or model 1, alias C 507).

In some examples, the handle is a user-friendly string used to refer loaded models that share the same external name, for example, different versions of the same model. Examples of a handle include a model's name; an arbitrary string; a string sourced from part of the model's address, etc. Aliases are typically not set by a user, but are generated and maintained by the edge deployment manager 204. The mapping of alias to handle is a N to 1 mapping.

An example of an API call is a loadmodel call. To perform this call, the edge deployment manager 204 validates the model signature and loads into memory artifacts associated with the model. In some examples, this requires all the required certificates to be installed along with rest of the binary installation. If the model's signature cannot be validated, then loading of the model fails with an appropriate return code and reason. In some examples, the loadmodel call includes one or more of: an identification of a model handle, an identification of a model alias, an indication of a location of a model and/or its runtime, an indication of input and/or output buffer sizes, an indication of a desired execution environment (e.g., accelerator (GPU, FPGA, etc.), processor, etc.), an indication of a number of instances to load, etc. Return status codes may include, but are not limited to: ok (load is successful), unknown (an unknown error has occurred), internal (an internal error has occurred), not found (model does not exist at the indicated location), already exists (model with the same name is loaded), resource exhausted (memory is not available to load the model), and/or failed pre-condition (model is not compiled for the machine).

There is a possibility that when all loaded model instances are busy, a customer-triggered load model fails due to memory contention. Given prediction time is much smaller than model loading time, and model loading is a much sparse event, a user-triggered model loading retries multiple times before fails in some examples.

An example of an API call is an unloadmodel call. This unloads a previously loaded model identified via the model handle and/or alias which was provided during loadmodel. If the handle or alias is not found, or the model is not loaded, then an error is returned. In some examples, the unloadmodel call includes one or more of: an identification of a model handle, an identification of a model alias, an indication of a location of a model and/or its runtime, etc. Return status codes may include, but are not limited to: ok (unload is successful), unknown (an unknown error has occurred), internal (an internal error has occurred), and/or not found (model does not exist at the indicated location).

An example of an API call is a listmodels call. This lists previously loaded models. In some examples, the return list is handles. In some examples, the return list includes handles and aliases. In some examples, the return also includes resource usage of a model and/or models (e.g., handle A=100 MB, handle A, alias A=50 MB, etc.). Return status codes may include, but are not limited to: unknown (an unknown error has occurred), internal (an internal error has occurred), and/or not found (no models not exist at the indicated location).

An example of an API call is a describemodel call. This describes a loaded model.

An example of an API call is a predict (or prediction) call. This performs inference using a previously loaded model identified via the model handle and/or alias which was provided during loadmodel. This call accepts a tensor (or identification of a tensor) that is fed to the identified model or alias. In some examples, the prediction API call includes one or more of an indication of if compression is to be used (and what type), if encryption/decryption is to be used (and how that is to be accomplished—e.g., where keys are located, etc.), and/or if batching is to be used. The output is the output tensor or scalar from the model. Return status codes may include, but are not limited to: ok (prediction is successful), unknown (an unknown error has occurred), internal (an internal error has occurred), and/or not found (model does not exist at the indicated location), and/or invalid argument (tensor type mismatch).

An example of a prediction API call is as follows:

```
// request for Predict rpc call
//
message PredictRequest {
string name=1;
repeated Tensor tensors=2;
}
//
// Tensor represents a tensor, encoded as contiguous multi-dimensional array.
// tensor_metadata—represents metadata of the shared memory segment
// data_or_handle—represents the data of shared memory, this could be passed in two ways:
// a. send across the raw bytes of the multi-dimensional tensor array
// b. send a SharedMemoryHandle which contains the posix shared memory
//segment
// id and offset in bytes to location of multi-dimensional tensor array.
//
message Tensor {
   TensorMetadata tensor_metadata=1; //optional in the predict request
   oneof data {
     bytes byte_data=4;
     // will only be used for input tensors
     SharedMemoryHandle shared memory handle=5;
   }
}
//
// Tensor represents a tensor, encoded as contiguous multi-dimensional array.
// tensor_metadata—represents metadata of the shared memory segment
// data_or_handle—represents the data of shared memory, this could be passed in two ways:
// a. send across the raw bytes of the multi-dimensional tensor array
// b. send a SharedMemoryHandle which contains the posix shared memory segment
// id and offset in bytes to location of multi-dimensional tensor array.
//
message Tensor {
   TensorMetadata tensor_metadata=1; //optional in the predict request oneof data {
     bytes byte_data=4;
     // will only be used for input tensors
     SharedMemoryHandle shared memory handle=5;
   }
}
}
//
// TensorMetadata represents the metadata for a tensor
// name—name of the tensor
// data_type—data type of the tensor
// shape—array of dimensions of the tensor
//
message TensorMetadata {
    string name=1;
    DataType data_type=2;
    repeated int32 shape=3;
}
//
// SharedMemoryHandle represents a posix shared memory segment
// offset—offset in bytes from the start of the shared memory segment.
// segment_id—shared memory segment id corresponding to the posix shared memory segment.
// size—size in bytes of shared memory segment to use from the offset position.
//
message SharedMemoryHandle {
    uint64 size=1;
    uint64 offset=2;
    uint64 segment_id=3;
}
```

In some examples, a listmodelalias API call is supported. This execution of this call causes a listing of model aliases that are loaded to be returned. An example of such a call is below.

```
/*!
\brief Return all model aliases registered with SMEdgeController.
Caller needs to use deleteModelAliasesList to free the memory allocated by this API.
\param ctrl The SMEdge handle returned from acquireSMEdgeCtrl( ),
\param aliases a pointer to list a list of c-style strings.
\param num_aliases a pointer to a integer, that is filled with number of strings in list.
\return SMEdgeStatus:
    SMEDGE_OK—model list returned successfully
    SMEDGE_INVALID_ARGUMENT—not a valid SMEdgeCtrl, or aliases or num_aliases is NULL
    SMEDGE_ERR—error encountered while gettign the aliases
*/
SMEDGE_DLL    SMEdgeStatus    listModelAliases (SMEdgeCtrl ctrl, char*** aliases, int* num_aliases);
```

In some examples, a deletemodelalias API call is supported. This execution of this call causes a deletion (freeing) of memory used by a model alias. An example of such a call is below.

```
/*!
\brief Free memory used by model alias list
\param ctrl The SMEdge handle
\param aliases a pointer to list a list of c-style strings.
param num_aliases a pointer to a integer, that is filled with number of strings in list.
\return SMEdgeStatus:
    SMEDGE_OK - memory freed successfully
    SMEDGE_INVALID_ARGUMENT - not a valid SMEdgeCtrl, or aliases is NULL, or num_aliases is
       less than zero
```

```
*/
SMEDGE_DLL SMEdgeStatus deleteModelAliasesList(SMEdgeCtrl ctrl, char** aliases, int
num_aliases);
```

In some examples, a setinputtensor API call is supported. This execution of this call causes an allocation for memory to store input tensor data (and the storage thereof). An example of such a call is below.
/*!
\brief Allocate internal input tensor and copy a user's input tensor into SMEdge
\param ctrl The SMEdge handle returned from acquireSMEdgeCtrl( )
\param handle The handle of the model
\param opaque input_tensors The handle to internal input tensors returned from acquireSMEdgeData( )
\param tensor_name The name of the input tensor
\param shape The shape of the input tensor
\param dim The number of dimensions of the input tensor
\param data The pointer to the user's input tensor
return SMEdgeStatus:
   SMEDGE_OK—set input tensor successfully
   SMEDGE_NOT_FOUND—model does not exist
   SMEDGE_INVALID_ARGUMENT—input argument is not valid
   SMEDGE_ERR—failed to set input tensor
*/
SMEDGE_DLL SMEdgeStatus setInputTensor(SMEdgeCtrl ctrl, const char* handle, void* opaque input_tensors, const char* tensor_name, const int64_t* shape, int dim, const void* data);

In some examples, an accessnuminputtensors API call is supported. This execution of this call retrieves the total number of input tensors stored. An example of such a call is below.
*/
\brief Get the total number of input tensors
\param ctrl The SMEdge handle returned from acquireSMEdgeCtrl( )
\param handle The handle of the model
\param num_tensors The pointer to save the number of input tensors
\return SMEdgeStatus:
   SMEDGE_OK—num of input tensors return successfully
   SMEDGE_NOT_FOUND—model does not exist
   SMEDGE_ERR—not a valid SMEdgeCtrl
*/
SMEDGE_DLL SMEdgeStatus accessNumInputTensors (SMEdgeCtrl ctrl, const char* handle, int* num_tensors);

In some examples, an accessinputtensormeta API call is supported. This execution of this call retrieves the input tensor metadata. An example of such a call is below.
*/
\brief Get the input tensor meta data
\param ctrl The SMEdge handle returned from acquireSMEdgeCtrl( )
\param handle The handle of the model
\param index The index of the input tensor
\param tensor_name The pointer to save the index-th tensor name
\param size The pointer to save the index-th tensor size in number of bytes
\param dim The pointer to save the number of dimensions of the index-th tensor \param type The pointer to save the index-th tensor type
\return SMEdgeStatus:
   SMEDGE_OK—input tensors metadata return successfully
   SMEDGE_NOT_FOUND—model does not exist
   SMEDGE_INVALID_ARGUMENT—wrong input tensor index
   SMEDGE_ERR—not a valid SMEdgeCtrl
*/
SMEDGE_DLL SMEdgeStatus accessInputTensorMeta (SMEdgeCtrl ctrl, const char* handle, int index, const char** tensor_name, int64_t* size, int* dim, TensorDataType* type);

In some examples, an accessInputTensorShape API call is supported. This execution of this call retrieves the input tensor shape. An example of such a call is below.
/*!
\brief Get the input tensor shape
\param ctrl The SMEdge handle returned from acquireSMEdgeCtrl( )
\param handle The name of the model
\param index The index of the input tensor
\param shape The pointer to save the index-th tensor shape
\param dim The number of dimensions of the input tensor
\return SMEdgeStatus
   SMEDGE_OK—input tensors shape return successfully
   SMEDGE_NOT_FOUND—model does not exist
   SMEDGE_INVALID_ARGUMENT—wrong input tensor index or dim
   SMEDGE_ERR—not a valid SMEdgeCtrl
*/
SMEDGE_DLL SMEdgeStatus accessInputTensorShape (SMEdgeCtrl ctrl, const char* handle, int index, int64_t* shape, int dim);

In some examples, an accessNumOutputTensor API call is supported. This execution of this call retrieves the total number of output tensors. An example of such a call is below.
/*!
\brief Get the total number of output tensors
\param ctrl The SMEdge handle returned from acquireSMEdgeCtrl( )
\param handle The handle of the model
\param num_tensors The pointer to save the number of output tensors
\return SMEdgeStatus
   SMEDGE_OK—num of output tensors return successfully
   SMEDGE_NOT_FOUND—model does not exist
   SMEDGE_ERR—not a valid SMEdgeCtrl
*/
SMEDGE_DLL SMEdgeStatus accessNumOutputTensors (SMEdgeCtrl ctrl, const char* handle, int* num_tensors);

In some examples, an accessOutputTensorMeta API call is supported. This execution of this call retrieves the output tensor metadata. An example of such a call is below.
/*!
\brief Get the output tensor meta data
\param ctrl The SMEdge handle returned from acquireSMEdgeCtrl( )

\param handle The handle of the model
\param index The index of the output tensor
\param tensor name The pointer to save the index-th tensor name
\param size The pointer to save the index-th tensor size in number of bytes
\param dim The pointer to save the number of dimensions of the index-th tensor
\param type The pointer to save the index-th tensor type
\return SMEdgeStatus
    SMEDGE_OK—output tensors metadata return successfully
    SMEDGE_NOT_FOUND—model does not exist
    SMEDGE_INVALID_ARGUMENT—wrong output tensor index
    SMEDGE_ERR—not a valid SMEdgeCtrl
*/
SMEDGE_DLL SMEdgeStatus accessOutputTensorMeta (SMEdgeCtrl ctrl, const char* handle, int index,
    const char** tensor_name, int64_t* size, int* dim,
    TensorDataType* type);
    In some examples, an accessOutputTensorShape API call is supported. This execution of this call retrieves the output tensor shape data. An example of such a call is below.
/*!
\brief Get the output tensor shape
\param ctrl The SMEdge handle returned from acquireSMEdgeCtrl( )
\param handle The handle of the model
\param index The index of the output tensor
\param shape The pointer to save the index-th tensor shape
\param dim The number of dimensions of the output tensor
\return SMEdgeStatus
    SMEDGE_OK—output tensors shape return successfully
    SMEDGE_NOT_FOUND—model does not exist
    SMEDGE_INVALID_ARGUMENT—wrong output tensor index or dim
    SMEDGE_ERR—not a valid SMEdgeCtrl
*/
SMEDGE_DLL SMEdgeStatus accessOutputTensorShape (SMEdgeCtrl ctrl, const char* handle, int index,
    int64_t* shape, int dim);
    In some examples, an accessOutputTensorData API call is supported. This execution of this call retrieves the output tensor data. An example of such a call is below.
/*!
\brief Get the output tensor data
\param ctrl The SMEdge handle returned from acquireSMEdgeCtrl( )
\param handle The handle of the model
\param opaque_output_tensors The handle to internal output tensors returned from predicto
\param index The index of the output tensor
\param out The pointer to save the output tensor
\return SMEdgeStatus
    SMEDGE_OK—output tensors data return successfully
    SMEDGE_NOT_FOUND—model does not exist
    SMEDGE_INVALID_ARGUMENT—wrong output tensor index
    SMEDGE_ERR—failed to access output data
*/
SMEDGE_DLL SMEdgeStatus accessOutputTensorData (SMEdgeCtrl ctrl, const char* handle, void* opaque_output_tensors, int index, void* out);

In some examples, an acquireSMEdgeData API call is supported. The execution of this call retrieves a handle associated with internal input tensors. An example of such a call is below.
/*!
\brief Get the handle to the internal input tensors
\param ctrl The SMEdge handle returned from acquireSMEdgeCtrl( )
\param handle The handle of the model
\return SMEdgeStatusData
    SMEDGE_OK—acquire SMEdgeData successfully
    SMEDGE_NOT_FOUND—model does not exist
    SMEDGE_ERR—not a valid SMEdgeCtrl
*/
SMEDGE_DLL SMEdgeStatusData acquireSMEdgeData (SMEdgeCtrl ctrl, const char* handle);
    In some examples, a releaseSMEdgeData API call is supported. The execution of this call releases internal output and input tensors. An example of such a call is below.
/*!
\brief Release SMEdge internal input/output tensors
\param ctrl The SMEdge handle returned from acquireSMEdgeCtrl( )
\param handle The handle of the model
\param opaque tensors The pointer to the handle of internal input/output tensors returned from acquireSMEdgeDatao/predict( ) that is to be released
\return SMEdgeStatus
    SMEDGE_OK—RELEASE SMEdgeData successfully
    SMEDGE_NOT_FOUND—model does not exist
    SMEDGE_ERR—failed to release SMEdgeData
SMEDGE_DLL SMEdgeStatus releaseSMEdgeData (SMEdgeCtrl ctrl, const char* handle, void** opaque tensors);
SMEDGE_DLL void smEdgeInit(void);
SMEDGE_DLL void smEdgeExit(void);
    In some examples, a smEdgeCaptureData API call is supported. The execution of this call captures data requested by a user. An example of such a call is below.
/*!
\brief Capture the Data Requested by a customer.
\param ctrl The SMEdge handle returned by acquireSMEdgeCtrl( ).
\param handle The handle of a registered model.
\param inference_timestamp time in iso 8061 format
\param inputs capture_data type containing all inputs
\param outputs capture_data type containing all outputs.
\param auxiliary inputs auxiliary data input.
\param auxiliary inputs auxiliary data output.
\return SMEdgeStatus
    SMEDGE_OK—capture data created successfully
    SMEDGE_NOT_FOUND—model does not exist
    SMEDGE_INVALID_ARGUMENT—input arguments are not valid
    SMEDGE_NO_NETWORK_ACCESS—unable to reach network
    SMEDGE_ALREADY_EXISTS—capture_id already exists
    SMEDGE_ERR_NO_PROVIDER—No provider configured
    SMEDGE_ERR_NOT_REG—device is not registered
    SMEDGE_BUSY—failed to add task
    SMEDGE_ERR—failed to capture data
*/
SMEDGE_DLL SMEdgeStatus smEdgeCaptureData (SMEdgeCtrl ctrl, const char* handle, const char* capture_id, const char* inference_timestamp, SMEdgeCapture- Data inputs, SMEdgeCaptureData outputs, SMEdgeCaptureData auxiliary inputs, SMEdgeCaptureData auxiliary outputs);

In some examples, a smEdgeCaptureData API call is supported. The execution of this call provides a status of captures. An example of such a call is below.
/*!
\brief Fetch the status of Captures.
\param ctrl The SMEdge handle returned by acquireSMEdgeCtrl( ).
\param capture_id ID of Captures
\return SMEdgeStatus
    SMEDGE_OK—capture data is done
    SMEDGE_UNKNOWN—unknown capture id
    SMEDGE_IN_PROGRESS—capture in progress
    SMEDGE_ERR—capture data fails
*/
SMEDGE_DLL SMEdgeStatus smEdgeCaptureDataStatus (SMEdgeCtrl ctrl, const char* capture_id);

Load model requests come in from the message handler 203 when the application 201 makes the request. When the edge deployment manager 204 receives a load model request in the context, the runtime orchestrator 233 loads a model and its runtime into memory and returns.

Prediction API calls come in from the message handler 203. The predictions happen in separate server threads. The threads map the prediction API calls to individual model instances in the pool. Multiple threads could map their prediction API calls to a model. In some examples, when a model supports concurrency, multiple predictions can be done simultaneously. Otherwise, the predictions are interleaved on the model instance. From each prediction thread, the prediction API call is synchronous, meaning it will not return until the prediction is done.

Figure 6:
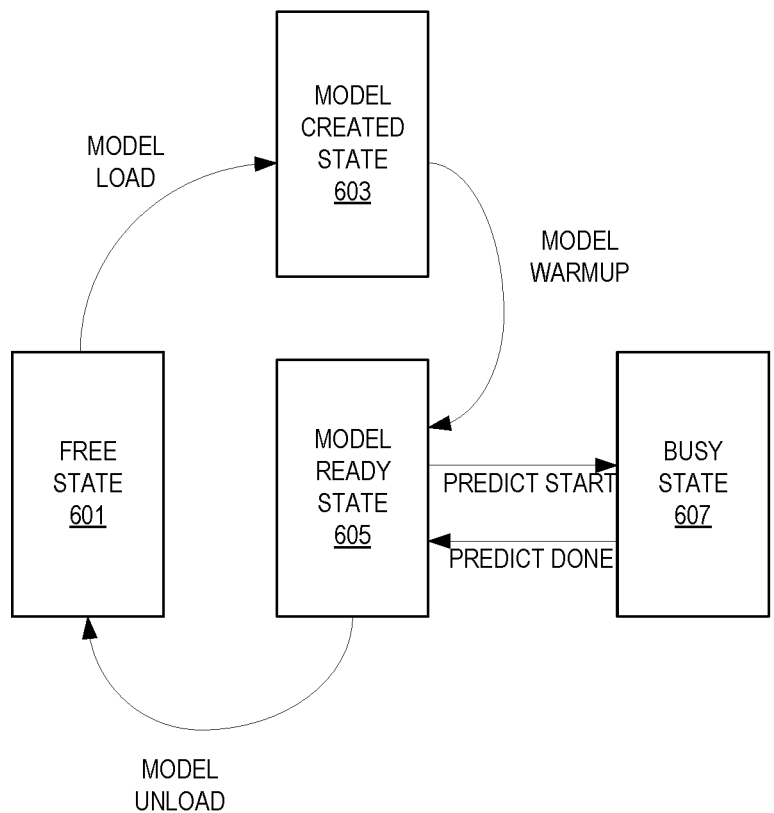
FIG. 6 illustrates examples of a lifecycle of a model in a model pool.

As models can be loaded, unloaded, etc. they have a lifecycle. FIG. 6 illustrates examples of a lifecycle of a model in a model pool. A model starts in a free state 601 where it is not loaded. A loadmodel request causes it to transition to a created state 603. The created state 603 transitions to a ready state 605 immediately if a warmup prediction is not needed. Otherwise, it transitions to the ready state 605 when warmup is done.

Once the model is in the ready state 605 it can service a prediction API call. When a prediction with the model starts, the model transitions to a busy state 607, and then to ready 605 again when the prediction returns. A model in the created 603 or ready state 605 can be unloaded. The state transitions are protected with locks.

In some examples, each model of a pool will have a load score that is a size/capability tuple. For example, a free model may have a score of 0.0 and a fully occupied model has score of 1.0. Models that are partially occupied have a score of concurrent_size/concurrent_capacity. A model with a load score of less than 1.0 can accept up to concurrent_capacity—concurrent_size new prediction API calls. The load score may be used for the scaling of the model pool. CPU and GPU memories limit how many model pools can be set up for different models and how large each pool can be. In some examples, one or more principles are applied to scale the model pool such as: 1) availability has priority over latency and throughput (that is the edge deployment manager 204 tries to load at least one instance of each new model. If no memory is available, edge deployment manager 204 will try to scale down one of the existing model pools so that this new model could be loaded); and/or 2) the edge deployment manager 204 tries to load new instances of a model if all instances in the pool is busy.

In some examples, there may not be a reliable way for the edge deployment manager 204 to know remaining CPU/GPU memory and the memory required to load a new model. In those examples, the edge deployment manager 204 may take a trial-and-error approach to loading. If a model loading fails due to unknown reasons, the edge deployment manager 204 assumes it is due to memory shortage.

In some examples, a CPU or GPU includes hardware to report resource usage. In those examples, the edge deployment manager 204 uses this information, along with prediction API call, priority, latency, etc. information to determine when a model is able be loaded and/or what model(s) need to be unloaded first.

In some examples, when a model and its runtime libraries/library both support concurrency (called single model concurrency), multiple prediction threads can use one instance of the model and its runtime libraries/library without exclusive locking of the instance from the edge deployment manager 204. Single model concurrency is a function of the model, the model's compiler, and the model's runtime. This capability may be acquired by the edge deployment manager 204 model layer by querying an underlying runtime adaptor layer.

Multiple model instances can be loaded to oversubscribe processing resources (e.g., a CPU, GPU, APU, etc.). In some examples, with low numbers of simultaneous prediction streams, multiple prediction streams using a single model instance have the same throughput gains as multiple model instances. If performance with a single model degrades, and hardware is not yet saturated, additional model instances can be loaded. Multiple model instances also have the cost of context switching between contexts. For models that do not support single model concurrency, in some examples one prediction API call is mapped to one of the preloaded models.

Figure 7:
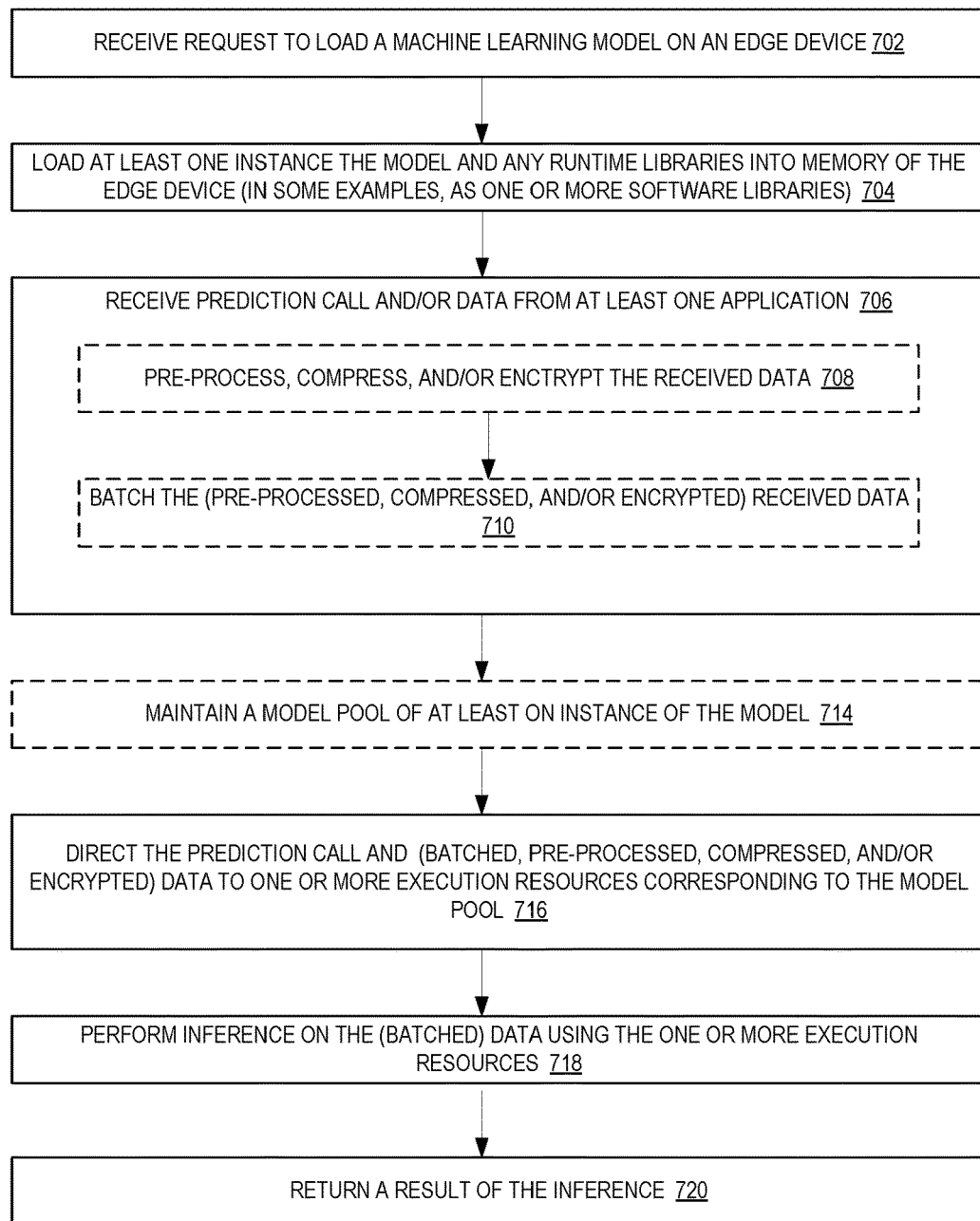
FIG. 7 is a flow diagram illustrating operations of a method for handling inference on an edge device according to some examples.

FIG. 7 is a flow diagram illustrating operations of a method for handling inference on an edge device according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the edge compute software 160, etc. of the other figures.

In some examples, a request to load a machine learning model on an edge device is received at 702. In some examples, the request is received directly by the edge device (e.g., edge device 120). In other examples, the request is received from an edge device service (e.g., edge device service 112) that allows for a more "central" maintenance of one or more edge devices.

In some examples, the request is a loadmodel call includes one or more of: an identification of a model handle, an identification of a model alias, an indication of a location of a model and/or its runtime, an indication of input and/or output buffer sizes, an indication of a desired execution environment (e.g., accelerator (GPU, FPGA, etc.), processor, etc.), an indication of a number of instances to load, etc. Return status codes for the request may include, but are not limited to: ok (load is successful), unknown (an unknown error has occurred), internal (an internal error has occurred), not found (model does not exist at the indicated location), already exists (model with the same name is loaded), resource exhausted (memory is not available to load the model), and/or failed pre-condition (model is not compiled for the machine).

At least one instance the model and any runtime libraries are loaded into memory of the edge device (in some examples, as one or more software libraries) at 704. A model may share a runtime library in a model pool or may reg
quire its own runtime library. In some examples, the edge deployment manager 204 determines which approach to take by analyzing the model and its runtime adaptor layer.

Figure 8:
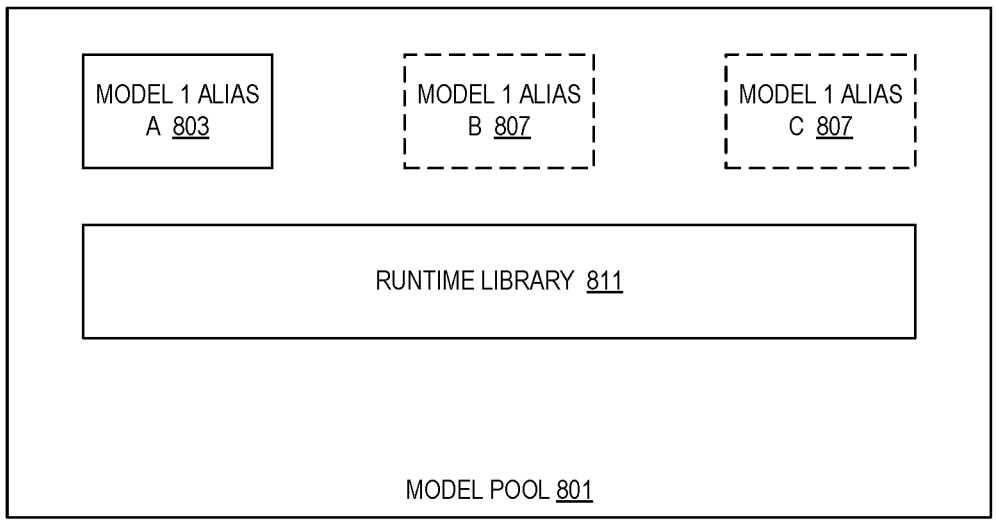
FIG. 8 illustrates examples of a shared runtime library usage.

When a model's runtime libraries support concurrency, the edge deployment manager 204 could choose to load a single instance of the runtime libraries and share it between multiple instances of the same model. FIG. 8 illustrates examples of a shared runtime library usage. In this pool 801 models 80., 805, and 807 all use runtime library 811. This is useful when runtime libraries have a significant memory footprint.

Figure 9:
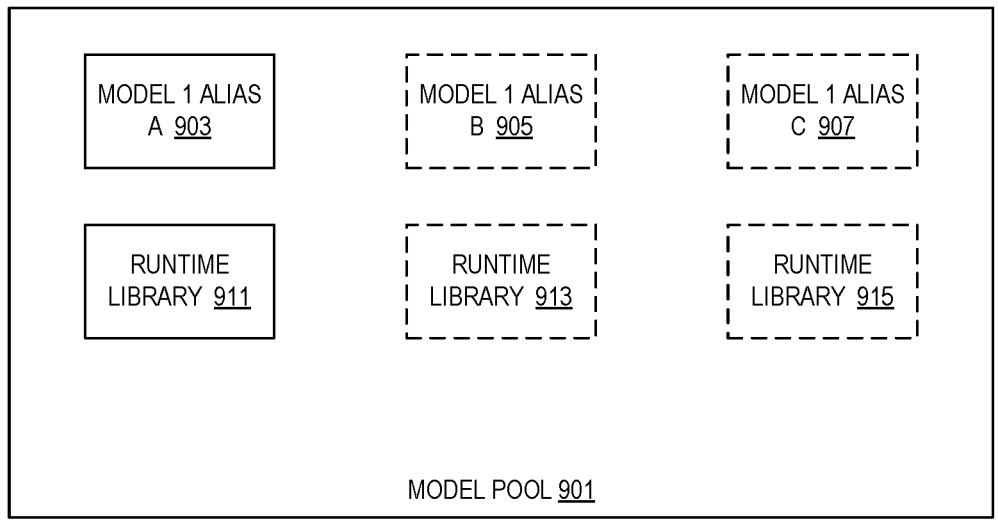
FIG. 9 illustrates examples of a model pool wherein each model has its own runtime library.

In some examples, each model of a model pool has its own runtime library. FIG. 9 illustrates examples of a model pool wherein each model has its own runtime library. In this example, models 903, 905, and 907 are in the pool 901 and each has its own associated library 911, 913, and 915. Generally, the vast majority of memory costs come from a model's architecture and weights, so the added cost of loading multiple runtime libraries is acceptable.

In some examples, the loading of a model may require that another model be unloaded. For example, if there is not enough memory to host the model and/or its runtime. Models that are not in use, used infrequently, etc. may be removed depending on the example. In some examples, the model is warmed up. In some examples, the model is loaded into a model pool wherein at least one other model of the model pool has the same external identifier (handle).

At some point later in time, a prediction API call and/or data from at least one application is received at 706.

In some examples, the received data is pre-processed (e.g., shaped, transformed, etc.) to be in line with what the model is expecting and/or compressed and/or encrypted. In some examples, the (pre-processed, compressed, and/or encrypted) received data is batched at 710.

In some examples, a model pool including at least one instance of the loaded model is maintained at 714. Note that this maintenance may be performed orthogonally to the handling of a prediction API call. For example, the model states of FIG. 6 are maintained.

At 716, the prediction API call and the (batched, pre-processed, compressed, and/or encrypted) data are directed to one or more execution resources.

In some examples, the prediction API call is mapped to the next "free" preloaded model(s) in the pool. If none of the preloaded models are free and the model supports single model concurrency, the prediction API call is mapped to an occupied model, such is in a round-robin, least recently used, most recently used, most frequently used, least frequently used, etc. fashion.

In some examples, if no preloaded model is available in a pool, a new instance of the same model is loaded, unless resource is not available, in which case the prediction API call fails. The limiting factors of maximum number of model instances are system resources like memory, number of GPUs available if model is GPU model, etc. As users have information about their devices and models the number of model instances is user-configurable in some examples.

To maximize the usage of machine learning hardware resources like a GPU on edge compute devices, predictions with machine learning models are interleaved on the same set of core groups and/or overlapped on different core groups in some examples.

By using a model pool, multiple instances of the same machine learning model can be created on an edge compute device to service prediction API calls. Those multiple instances can be overlapped on a hardware device by mapping the prediction to different core groups and contexts, thus improving the overall throughput and latency of customer application's prediction API calls.

For each of the model instances loaded on the hardware, multiple prediction API calls can be interleaved on software layers above the model layer to reduce the idle time of each of the model instances, thus creating an over-subscription for the hardware device to maximize the usage of the hardware.

Figure 10:
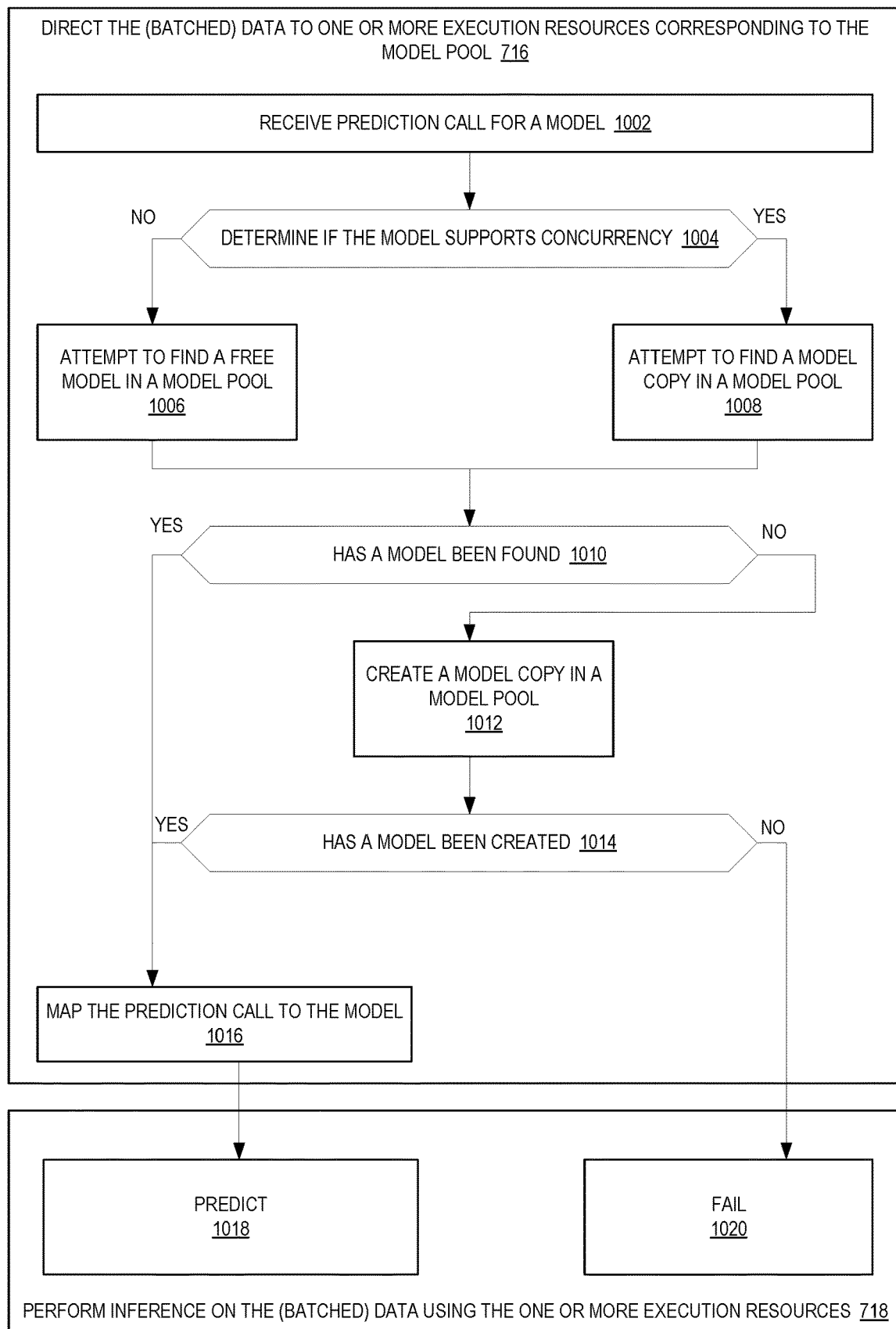
FIG. 10 is a flow diagram illustrating operations of a method for handling one or more prediction API calls according to some examples.

FIG. 10 is a flow diagram illustrating operations of a method for handling one or more prediction API calls according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the edge compute software 160, model training and packaging service 110, and/or the edge device service 112 of the other figures.

In some examples, the acts detailed herein relate to the directing of (batched) data to one or more execution resources corresponding to the model pool at 716 and/or performing inference on the (batched) data using the one or more execution resources at 718. Note that when compression is used the compressed tensors need to be decompressed first and/or when encryption is used the tensors need to be decrypted.

A prediction API call for a model is received at 1002. For example, the request is received by the edge deployment manager 204. In some examples, the request comes from message handler 203.

A determination if the model supports concurrency is made at 1004. Details of this determination were detailed earlier. When the model supports concurrency, there is an attempt to find a model copy in a model pool at 1008. The model does not support concurrency, there is an attempt to find a copy of the model in a model pool at 1006.

When no model has been found a model copy is created in the model pool at 1012. After the creation, or if the model had been found, a determination of if the model has been created is made at 1014. For example, a model creation may fail if there is no memory available and thus prediction cannot occur.

When the model has been created, the prediction is mapped to the model at 1016. In some examples, the mapping may take one of several forms. In some examples, multiple inputs and batching are used. When multiple inputs and batching is supported, multiple samples are sent to the model in one prediction API call, with multiple inputs, and batches in each of the inputs.

Figure 11:
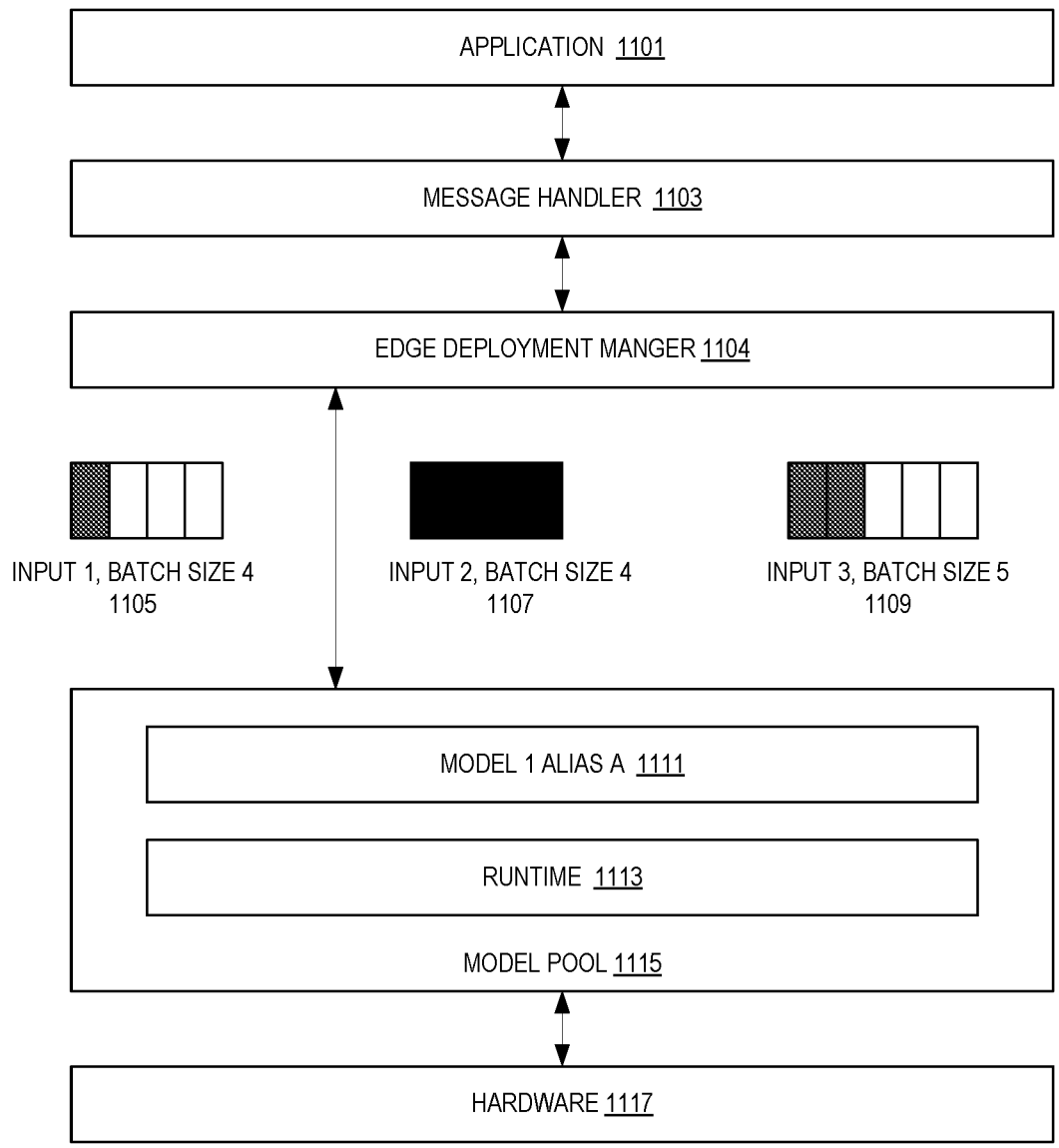
FIG. 11 illustrates examples of multiple inputs and batching.

FIG. 11 illustrates examples of multiple inputs and batching. Typically, the file in the model package specifies the input list and batch size as dimension parameter in each of the inputs. In this example, the application 1101 provides data (and prediction API calls) via the message handler 1103 to the edge deployment manager 1104. The edge deployment manager 1104 or application 1101 batches the various inputs (here shown as input 1 batch 1105, input 2 batch 1107, and input 3 batch 1107) to be able to send multiple samples in a single request to model 1, alias A 1111 and its runtime 1113 from the model pool 1115 (note other models, if they exist, are not shown). As such, in some examples, there are at least two ways to aggregate input samples into multiple inputs: 1) the application aggregating multiple samples or 2) the edge deployment manager 1104 aggregating multiple inputs.

Figure 12:
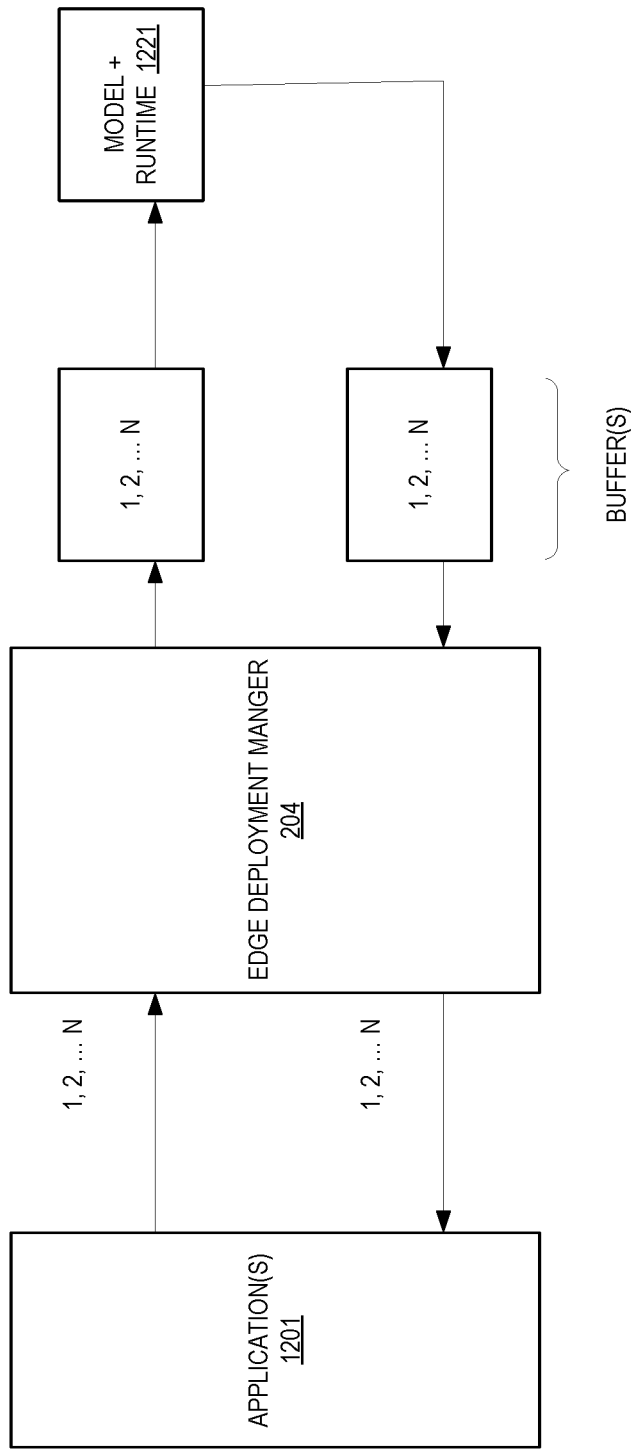
FIG. 12 illustrates examples of an application aggregating.

When an application does the aggregating, the edge deployment manager 1104 passes the request buffer to the model, either by copying the input buffer, or using shared memory (both detailed above). This is the way that edge deployment manager 1104, as an I/O to model and its runtime, will not incur extra time penalties. FIG. 12 illustrates examples of an application aggregating. As shown, one or more applications 1201 provide input data to the edge deployment manager 1104 which fills a buffer for the model and runtime 1221. The results of the predictions are buffered, then handled by the edge deployment manager 1104 to be sent back to the one or more applications 1201.

When the edge deployment manager 1104 does the aggregating. In some examples, the edge deployment manager 1104 uses internal control structures to map the requests and their buffers to processing context, internal data structures to cache the prediction API calls before it can be hand off to the models, and a completion queue to handoff result to the requests after batched inference is done.

A goal is to keep a model as fully occupied as possible. There will be at least two triggers that the edge deployment manager 1104 drains cached requests to a model: when a prediction API call is received by the edge deployment manager 1104 and/or when model's load size is smaller than its batching capability. In both those two triggers, if the model instance's load size is smaller than the batch capability, prediction API calls from the cache will be drained as many as possible to try to fully occupy the model. For example, if the capability is 10 and current load is 3, then there are 7 free slots, and the edge deployment manager 1104 will drain up to 7 prediction API calls to the model.

Figure 13:
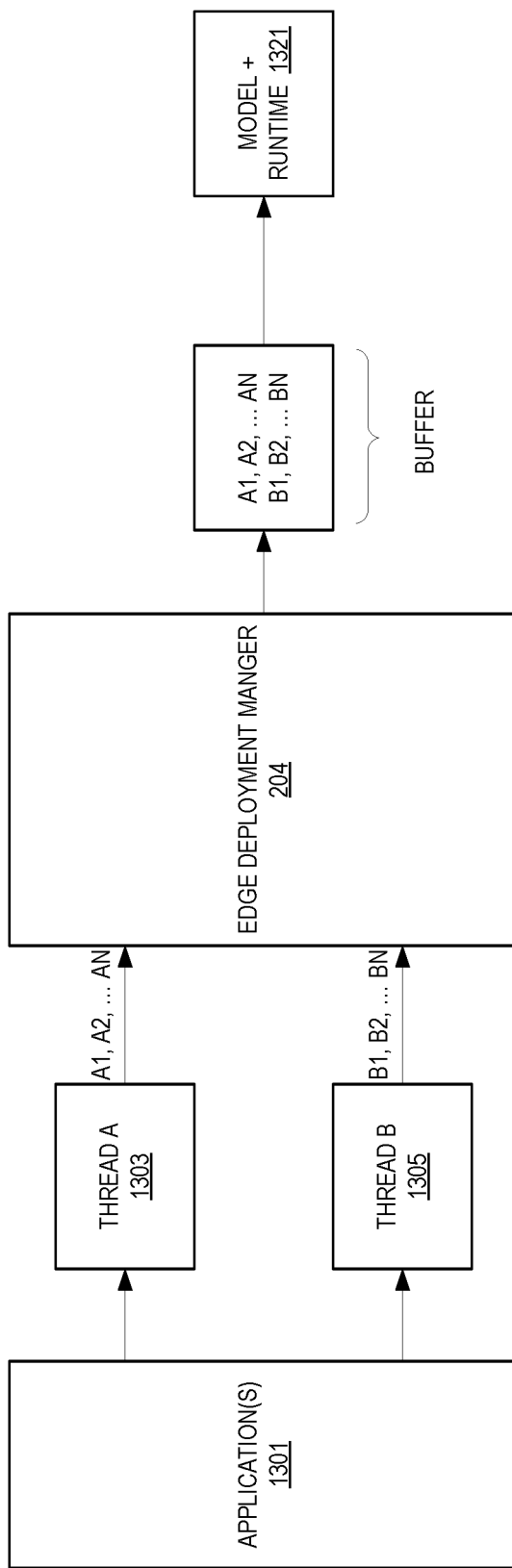
FIG. 13 illustrates examples of single model model/runtime-level multi-threading.

In some examples, single model model/runtime-level multi-threading is utilized. If a model and its runtime libraries both support concurrency (single model concurrency), multiple prediction threads can use one instance of the model and its runtime libraries without exclusive locking of the instance from the edge deployment manager 1104. Single model concurrency is a function of the model, the model's compiler, and the model's runtime. This capability is acquired by the edge deployment manager 1104 by querying the underlying runtime adaptor layer. FIG. 13 illustrates examples of single model model/runtime-level multi-threading.

An application 1301 uses multiple prediction threads (thread A 1303 and thread B 1305. Each thread generates its own prediction API calls which are provided to the edge deployment manager 1104 which buffers the predictions. Note that the predictions from the threads may be interleaved. The model and runtime 1321 reads the prediction API calls from the buffer(s) and generates a prediction for each request.

In some examples, the application 1301 application sends multiple prediction streams in multiple threads, with each thread carrying one stream and in other examples the application sends multiple predictions in one thread and the edge deployment manager 1104 interleaves the requests into multiple threads.

In some examples, predictions are overlapped on threads using multiple model instances. Overlapping upper layer processing to available instances of under layer provides parallel programming and efficiency gains by fully use the underlying services. This may be useful when an application does not support multiple input/batching. Multiple model instances can be loaded to oversubscribe hardware.

Figure 14:
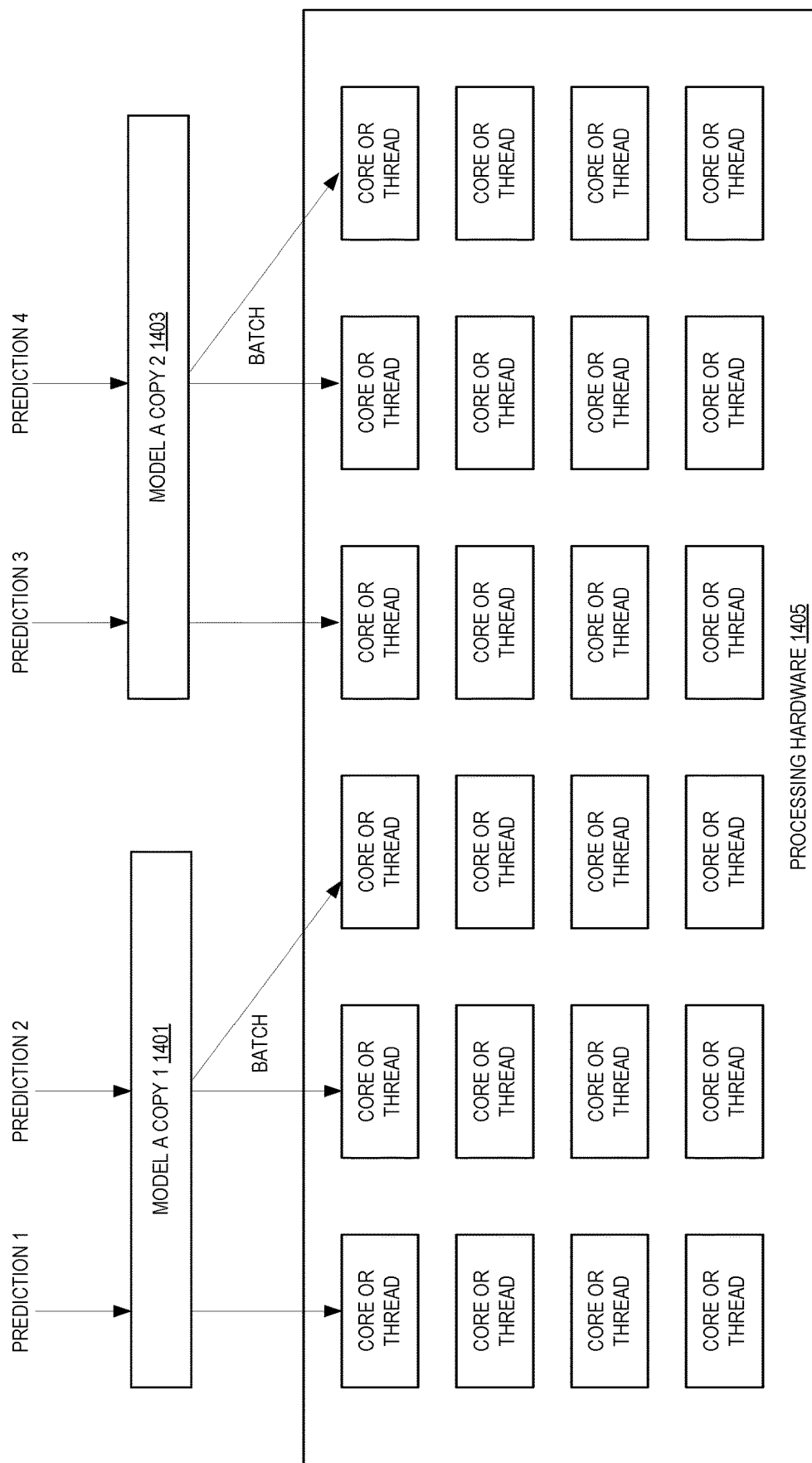
FIG. 14 illustrates examples overlapping multiple layers.

FIG. 14 illustrates examples overlapping multiple layers. As shown, multiple prediction API calls (inputs) are received by multiple copies of model A (1401 and 1403). In some cases, a prediction is made without batching on a set of cores/threads while in other cases multiple samples are batched and then dispatched to a different set or sets of cores/threads.

In some examples, the edge deployment manager 1104 interleaves multiple prediction API calls from one user thread. In some examples, when the message handler 203 supports asynchronous calls, the edge deployment manager 1104 put requests from one stream into different threads and a completion queue is used to trigger callback. This removes the burden of managing threads from customer application.

With a blocking message handler 203, a return right away from the message handler 203 can be done when a predict request comes, and the request handled in a message handler 203 thread. Once the prediction is done, a registered callback is triggered for output tensor handoff. With this, customer application does not need to manage threads for the prediction streams either.

In some examples, the edge deployment manager 1104 uses multiple model instances. In some examples, the loading request specifies how many instances to load when loading model. As some processing hardware has multiple cores, when a model supports multiple inputs and batching, the edge deployment manager 1104 could utilize that capability so that multiple predictions can be overlapped on the available cores to achieve parallelism.

Figure 15:
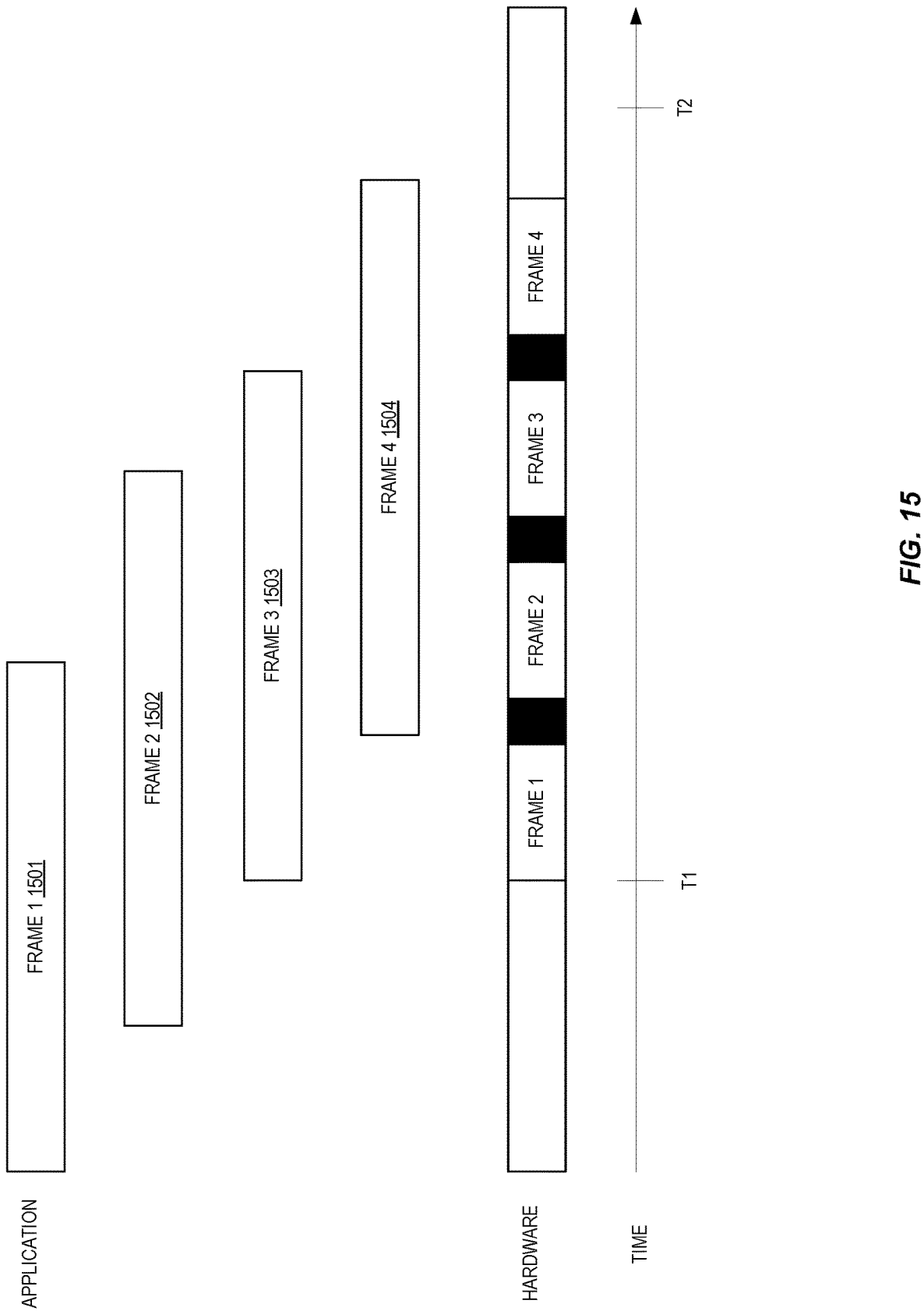
FIG. 15 illustrates examples of a reduction of idle time by interleaving predictions.

In some examples, the edge deployment manager 1104 practices interleaving at one or more processing layers. In multi-threading, predictions that previously have to wait can be served by previously idle resources, thus improving performance. FIG. 15 illustrates examples of a reduction of idle time by interleaving predictions. As shown, there are four frames 1501-1504 from the application to process using hardware. These frames are interleaved such that the hardware is more efficiently used (that is while one or more frames is/are being processed by the application, the model running on hardware can predict a frame that has been generated by the application.

Hardware 1117 will run the model 1, alias A 1111 and its runtime 1113 to process the inputs.

Turning back to FIG. 10, at 1018 the prediction will occur according to the mapping, etc. and fail at 1020 when a model has not been created to map to. 718 of FIG. 7 where inference is performed on the (batched) data using the one or more execution resources and a result of the inference is returned at 720.

Figure 16:
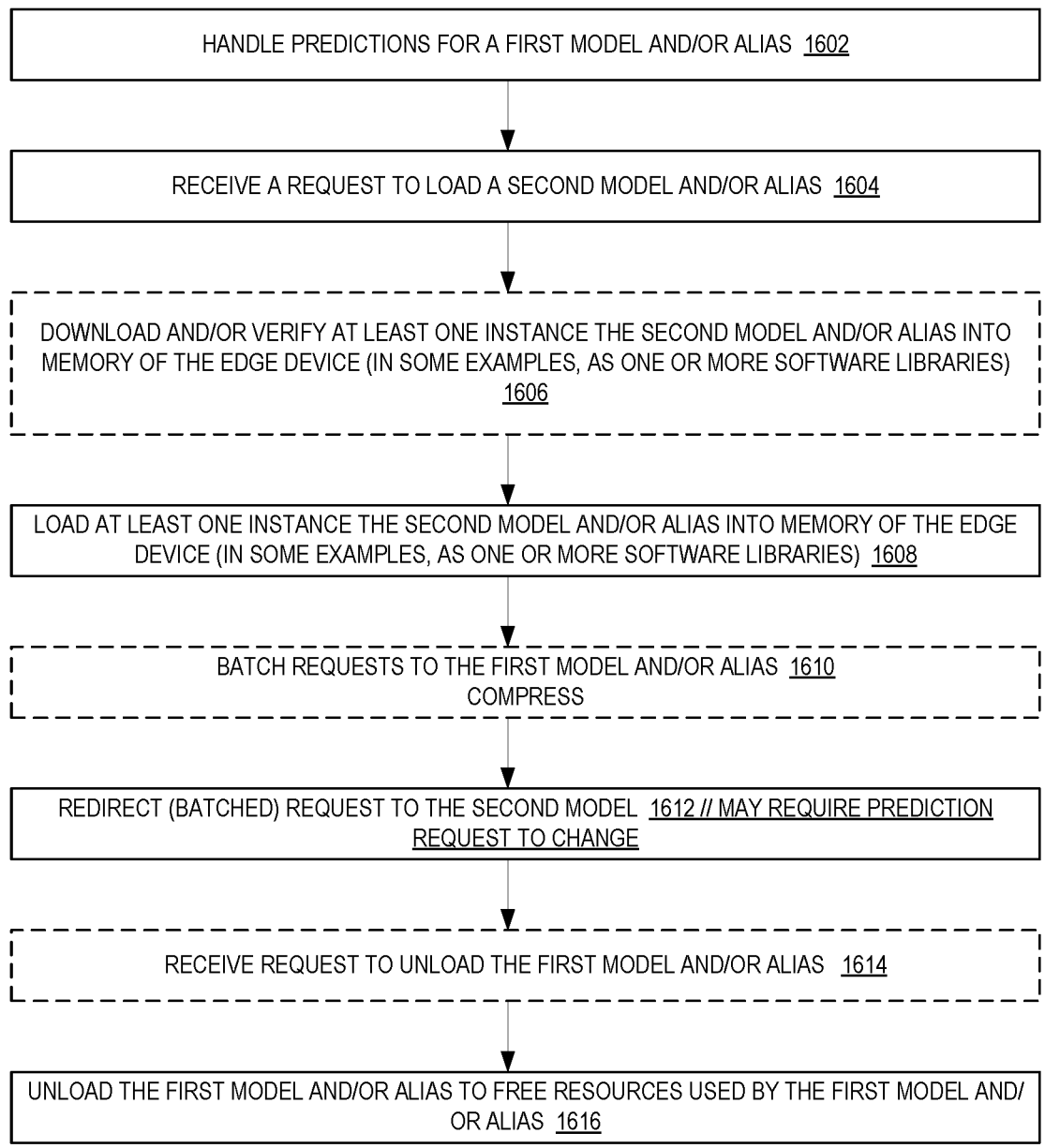
FIG. 16 is a flow diagram illustrating operations of a method for at least performing inference using multiple models at the same time according to some examples.

FIG. 16 is a flow diagram illustrating operations of a method for at least performing inference using multiple models at the same time according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the edge compute software 160, model training and packaging service 110, and/or the edge device service 112 of the other figures.

Predictions for a first model and/or alias are handled at 1602.

A request to load a second model and/or alias is received at 1604. Details of such a request have been described above.

In some examples, one or more of downloading and/or verifying a model and/or runtimes are performed at 1606.

At least one instance the second model and/or alias and/or runtimes is loaded into memory of the edge device at 1608. In some examples, loading is only performed if verified.

At 1610 requests (at least the tensors thereof) to the first model and/or alias are batched in some examples. In some examples, the tensors are compressed and/or pre-processed. As noted above, the use of batching may be implementation dependent.

Prediction API calls (in some examples batched requests) are redirected requests to the second model at 1612 which performs the prediction(s). The first model is no longer used. Note that when compression is used the compressed tensors need to be decompressed first.

In some examples, a request to unload the first model and/or alias is received at 1614. In other examples, the first model and/or alias is to be unloaded automatically.

The first model and/or alias to free resources used by the first model and/or alias is unloaded at 1616

Many times, alternative model versions can be developed to validate hypothesis, and multiple alternative versions will have to go through multiple cycles in order to collect data and compare their merits.

Moreover, when going through multiple cycles, the prediction contexts could vary, reducing the confidence of comparing the captured data between those versions.

This lengthy multiple cycles approach can be done in as few as one cycle, by deploying multiple alternative versions of the model to an edge compute device at the same time, all with the same external identifier (handle) but with different internal IDs (aliases). The models are grouped into a model pool on the device and share the same customer-facing ID that a customer application can refer to for prediction service.

When a prediction API call comes, the input tensors are duplicated and routed to all of the versions. This guarantees that the prediction contexts are the same for all the versions, thus the data collected can be used for comparing with high confidence.

This reduces the multiple cycles needed to compare alternative versions of a model, thus reduces the time needed to develop models, and the data collected are more comparable between alternative model versions.

Figure 17:
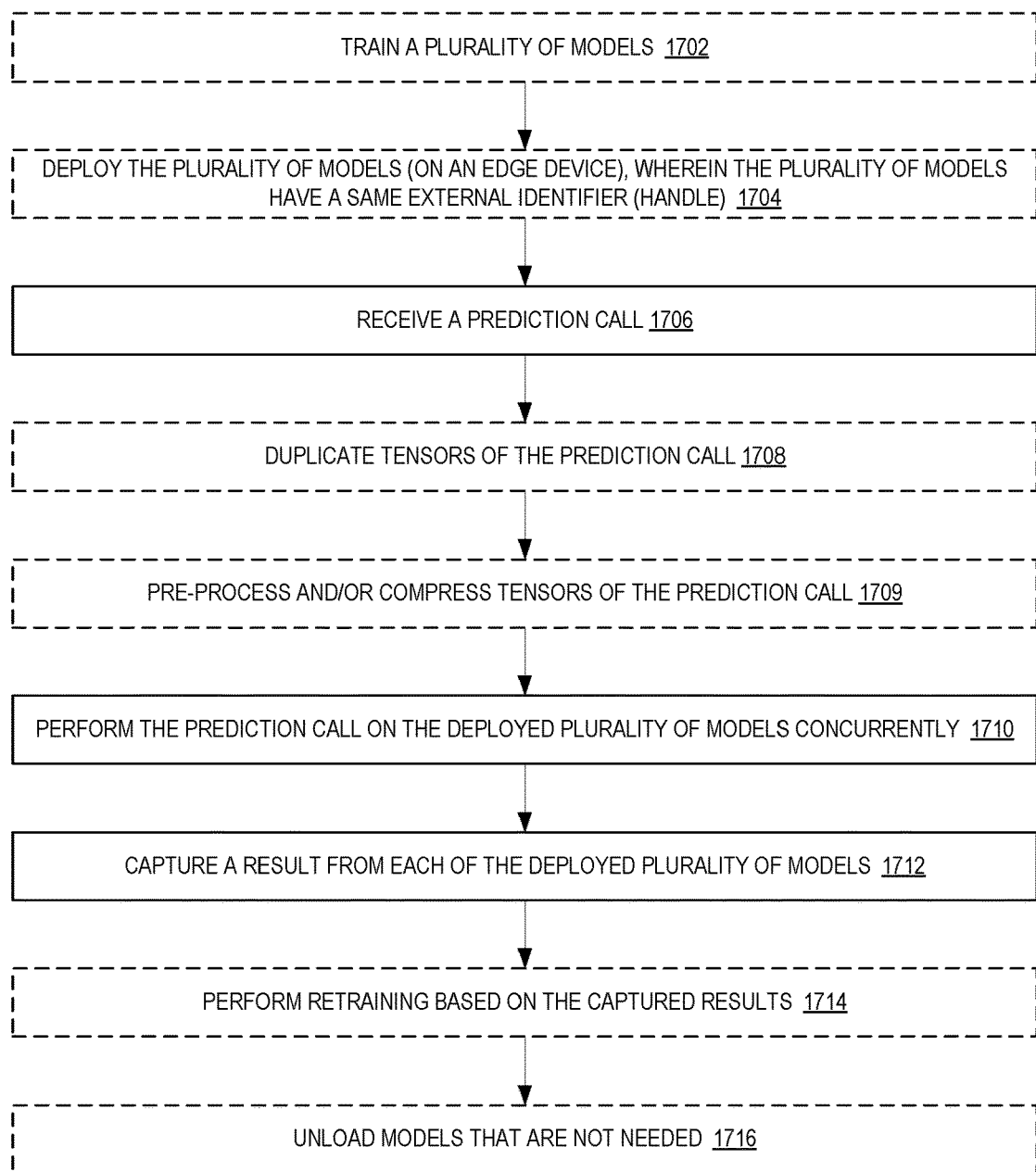
FIG. 17 is a flow diagram illustrating operations of a method for model life cycle management according to some examples.

FIG. 17 is a flow diagram illustrating operations of a method for model life cycle management according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the edge compute software 160, model training and packaging service 110, and/or the edge device service 112 of the other figures.

In some examples, a plurality of models is trained at 1702. This training may be done using a model training and packaging service 110.

A plurality of models is deployed (on an edge device), wherein the plurality of models have the same external identifier (handle) at 1704. The deployment may be a loading into one or more model pools.

A prediction API call is received at 1706. This request is to be sent to all of the loaded models having the same handle.

In some examples, tensors of the prediction API call are duplicated at 1708. In other examples, the models having the same handle share memory (e.g., input buffers) eliminating the need for duplication.

In some examples, the tensors are pre-processed and/or compressed at 1709.

The prediction API call is performed on the deployed plurality of models having the same handle concurrently at 1710. Note that when compression is used the compressed tensors need to be decompressed first.

A result from each of the deployed plurality of models having the same handle is captured at 1712. In some examples, this a capture API call requests these results.

In some examples, retraining based on the captured results is performed at 1714. In some examples, this training is performed using the model training and packaging service 110. In some examples, models that are not needed are unloaded at 1716.

In some examples, multiple models are connected as a part of an inference process. Model graph refers to the practice of connecting multiple models by using the output tensors of models as the input tensors of at least one other model. Model chaining is a special chase of model graph where the output of a model is fed into only one other model. Existing techniques for using model graphing is to hardcode the graph into application code. As such, topologies are decided at compile-time and reconfiguration (the reconnection of nodes to form different typologies) requires application changes which are, at the very least, disruptive to production.

In some examples, the edge deployment manager 204 supports the generation and/or maintenance of model graphs. In particular, a user can provide the edge deployment manager 204 with a configuration and the edge deployment manager 204 generates a directed graph.

Figure 18:
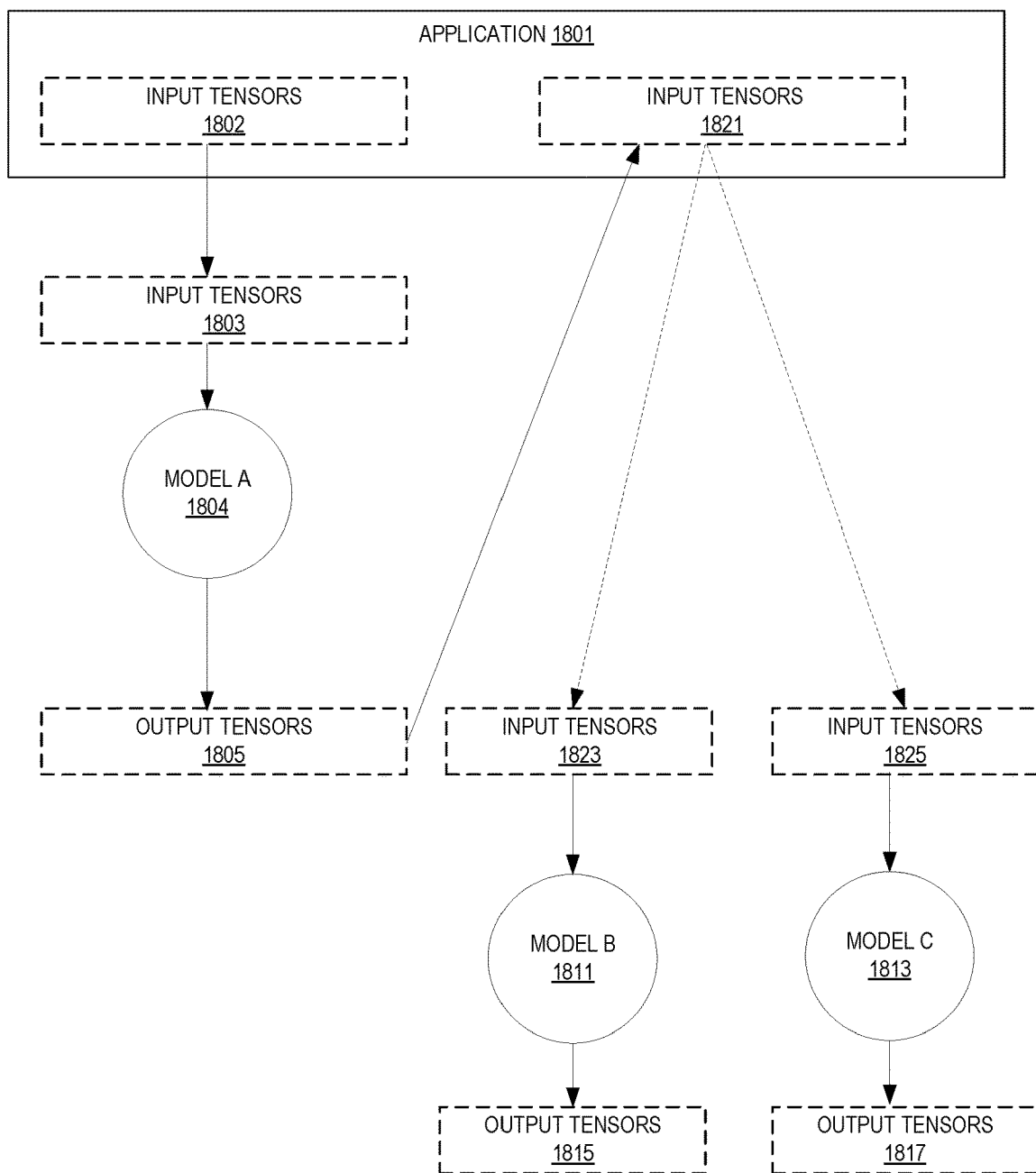
FIG. 18 illustrates examples of model graph usage having intermediate processing.

FIG. 18 illustrates examples of model graph usage having intermediate processing. As illustrated, an application 1801 generates input tensors 1802 which are then copied or shared 1803 with model A 1804. Model A 1804 generates output tensors 1805 which the application 1801 manipulates into a different set of input tensors 1821.

The second set of input tensors 1821 is copied or shared (input tensors 1823 and 1825) with model B 1811 and model C 1813 respectively. Examples of sharing and copying have been detailed earlier. Each of these models generates output tenors (output tensors 1815 and 1817).

For many graphs, intermediate processing by an application of tensors output from a model is not needed. This means that some models' output tensors can be directly used as some other models' input tensors. For these cases, topology changes and reconfiguration are runtime decisions.

Figure 19:
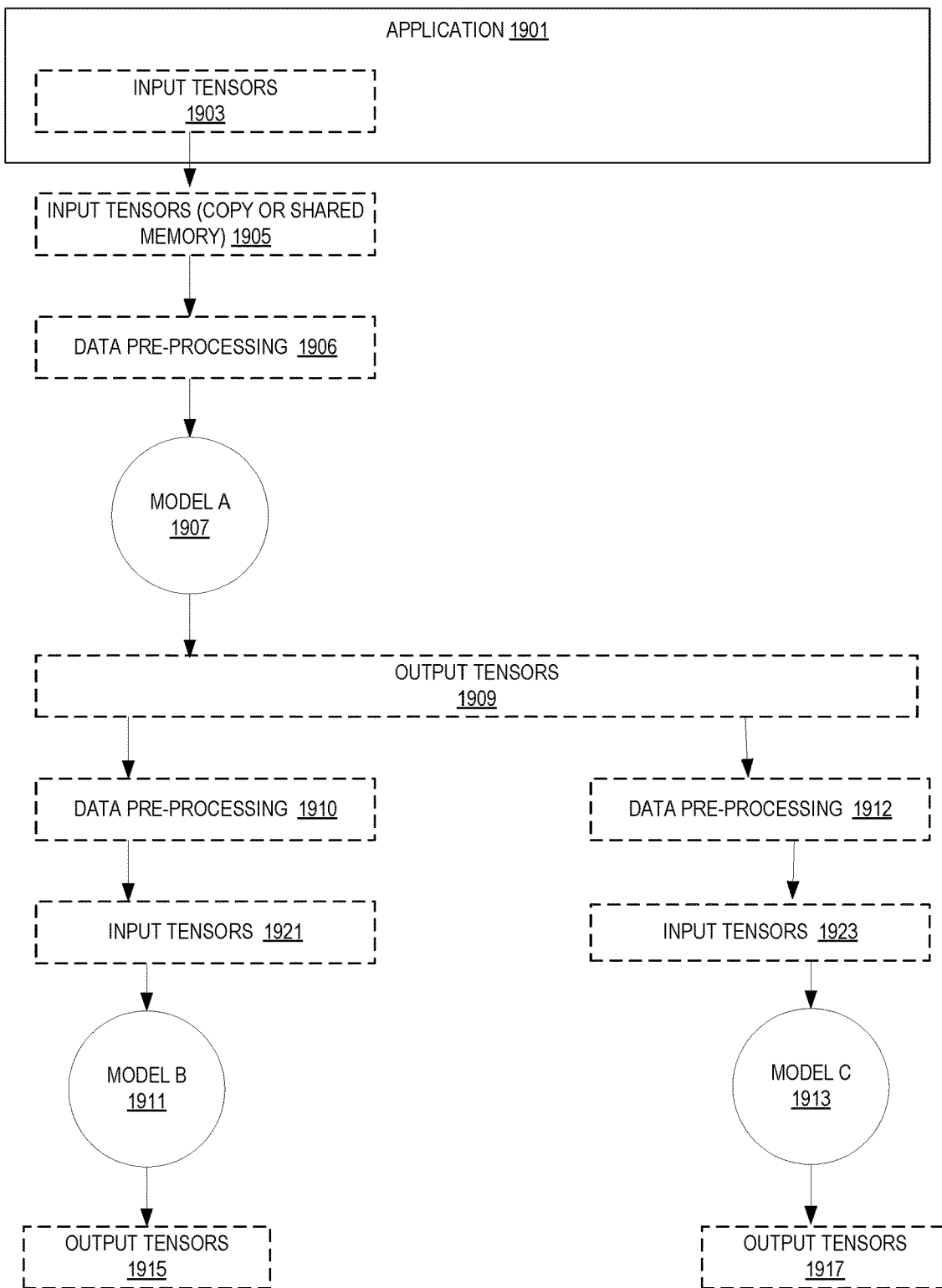
FIG. 19 illustrates examples of model graph usage where there is no need to have intermediate processing.

FIG. 19 illustrates examples of model graph usage where there is no need to have intermediate processing. As illustrated, an application 1901 generates input tensors 1903 which are then copied or shared 1905 to be used with model A 1907. In some examples, the input tensors are subjected to data pre-processing 1906. This data pre-processing may also be a node in the model graph usage (that is the model graph may have model nodes, data pre-processing nodes, data copying nodes, etc.).

Model A 1907 generates output tensors 1805 from the (pre-processed) input tensors and generates output tensors 1909 to be used as input tensors 1921 and 1923. These output tensors may be subjected to pre-processing node (such as pre-processing node 1910 or 1912). When not subjected to pre-processing, the output buffers used by model A 1907 can used as input buffers 1921 and/or 1923 of model B 1911 or model C 1913. Because the input and output tensors are not copied around, significant saving can be achieved as comparing to run prediction on those models from separate prediction API calls. Model B 1911 and model C 1913 also generate output tenors (output tensors 1915 and 1917).

Figure 20:
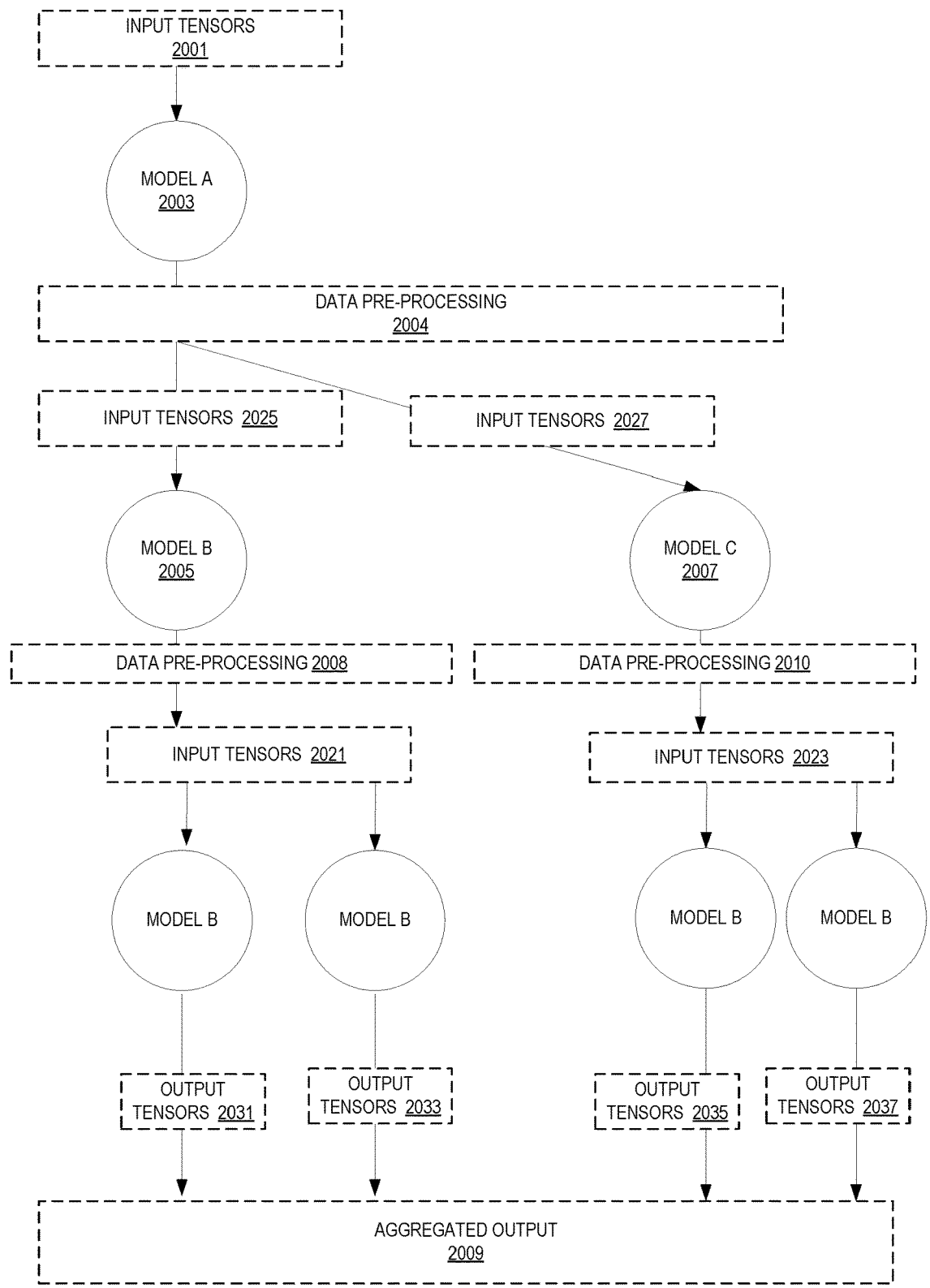
FIG. 20 illustrates examples of model graph usage where there is no need to have intermediate processing and at least one model is reused.

FIG. 20 illustrates examples of model graph usage where there is no need to have intermediate processing and at least one model is reused. As illustrated, input tensors 2001 are copied or shared with model A 2003. This data pre-processing may also be a node in the model graph usage (that is the model graph may have model nodes, data pre-processing nodes, data copying nodes, etc.).

Model A 2003 generates output tensors to be provided as input 2025 and 2027 to model B 2005 and model C 2007. The output of model B 2005 is provided to two instances of model B 2005 (as input tensors 2021) and the output of model C 2007 is provided to two instances of model B 2005 (as input tensors 2023). The output of the second layer of model Bs 2005 (shown as output tensors 2031, 2033, 2035, and 2037) is aggregated as aggregated output 2009.

In some examples, data pre-processing such as data pre-processing 2004, 2008, and/or 2010 is applied.

In some examples, a model graph is maintained using an array of model handles (e.g., next_stage) in each loaded model's metadata. In some examples, original input tensors are fed into the input model by using the predict API. After the prediction, the model meta data next_stage array is traversed by the edge deployment manager 204 and the output tensors are fed into the input of the loaded models whose handles are in the array. When a model is in a graph, and its next_stage array is empty, its output will be used in an aggregated output of traversal.

At runtime, the edge deployment manager 204 merely needs an indication of a topology change of the graph with a reconfiguration command (e.g., from an application) without changing the application itself. The topology change can be as simple as a new value to a function parameter. In some examples, the reconfiguration command points to a location storing a configuration file. In those examples, the application does not need to change so long as the configuration file is at a static location.

In some examples, a model graph is configured using the messaging handler 203 and in other examples by using the edge device service 112.

Figure 21:
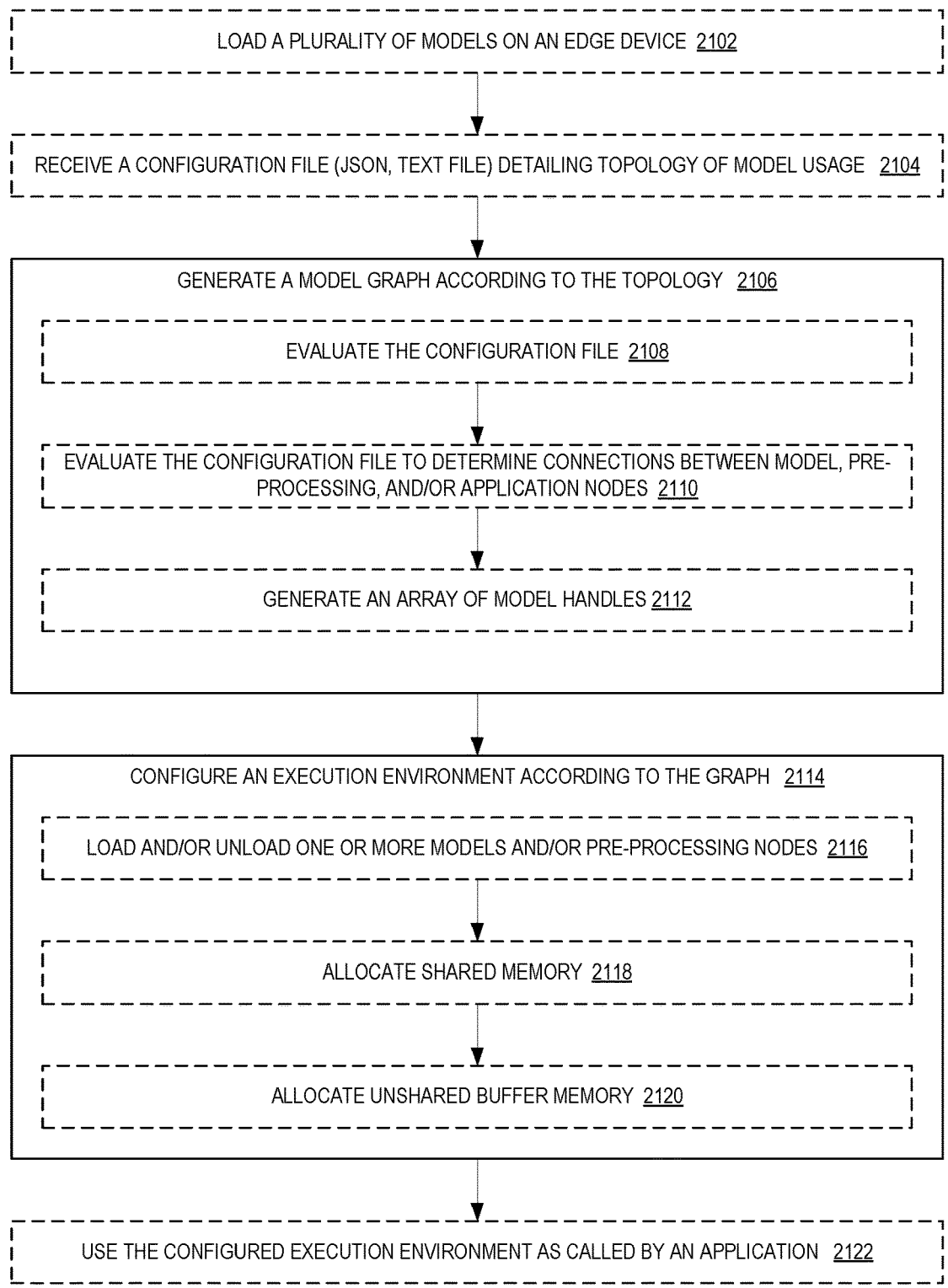
FIG. 21 is a flow diagram illustrating operations of a method for model life cycle management according to some examples.

FIG. 21 is a flow diagram illustrating operations of a method for model life cycle management according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the edge compute software 160, model training and packaging service 110, and/or the edge device service 112 of the other figures.

A plurality of models is loaded on an edge device at 2102. This loading can happen over time.

A configuration file (such as a JavaScript Object Notation (JSON) or other text file) detailing topology of model usage is received at 2104. In some examples, this file is received as a part of a request from an application. In some examples, this file is received as a part a handling of a request from an edge device service. In some examples, a model graph generation request includes one or more of: a location of a configuration file, the configuration file, a checksum for the configuration file, a type of device to be used to host the model, an address of an edge device, a port of an edge device, an edge device name (used similarly to DNS for lookup and translation), and an indication of checksum function used on the configuration file. In some examples, return codes for a model graph generation request include one or more of: at least one model does not exist, checksum failed, at least one model is not compiled for the machine, etc.

The configuration file may come from an application on the edge device, the edge device service 112, or other entity.

An example of a configuration file is as follows:
$ sudo python3 grpc_client_example.py ChainModel -h
usage: grpc_client_example.py ChainModel [-h]—inputHandle MODEL_HANDLE—outputHandle [MODEL_HANDLE,MODEL_HANDLE, . . . ]
optional arguments:
-h, —help show this help message and exit
ChainModel arguments:
—inputHandle MODEL_HANDLE
handle of the model loaded with agent that serves as input node of the graph
—outputHandle MODEL_HANDLE
handle of the model loaded with agent that serves as output node of the graph
[MODEL_HANDLE,MODEL_HANDLE, . . . ] handles of the models that loaded with agent, and will be the next stage of the first model FIG. 22 illustrates an of at least part of a JSON configuration file. As shown, this defines a plurality of nodes for a model graph. Each node has one or more of a location of a model (S3URL in this example), a checksum for the model and a type of encryption used, a location of a pre-processing node, a handle for the model of the node, and an indication of any children. Note that there may be no children.

A model graph is generated according to the topology at 2106. In some examples, the model graph is an array of model handles. This generation may have multiple acts.

In some examples, the configuration file itself is evaluated at 2108. The evaluation includes one or more of determining if the model paths are correct, if the models have been loaded, if a checksum for a node fails, if a model is not compiled for the machine, etc.

In some examples, the configuration file is evaluated to determine connections between model, pre-processing and/or application nodes at 2110. Looking at FIG. 22, for the node for RESNET18 the next_stage includes the two children of RESNET_2 and MOBILENETV1.

A data structure of connections (e.g., an array of model handles) is generated from that evaluation at 2112 is some examples. Note that other ways of making a graph not using such a data structure may be used.

An execution environment is configured according to the graph at 2114. This configuration may have multiple acts. In some examples, there is a load and/or unload one or more models and/or pre-processing nodes at 2116. Note that may not be possible to load all models of the graph and thus some unloading and/or loading may need to occur during execution of the graph.

In some examples, at 2118 shared memory to be used for output/input buffering is allocated. As noted above, shared memory may be used when there is no pre-processing.

Unshared buffer memory is allocated at 2120 in some examples. For example, when a copy needs to be done buffer memory is allocated for an "original" buffer and one or more copies.

Note that batching may also be used such that the input/output buffers batch results.

The configured execution environment is used as called by an application at 2122. In some examples, the call is a predict request to a model in the model graph which causes the use of the configured execution environment. For example, a predict call identifies a model in the graph via the model handle and/or alias and identifies a tensor to use. Note that the model need not be the root in the graph. In some examples, the as the graph is traversed models may need be loaded or unloaded.

In some examples, distributed prediction is utilized. This may be needed when a model or models need a larger memory footprint than an edge device may be able to locally provide. That is one or more applications of a location machine generate input tensors (and/or pre-process those tensors) and then make one or more tensor buffers available for one or more remote machines hosting one or more prediction models. After prediction is done, output tensors are made available to the location machine from remote machine for post-processing. Note that local and remote may refer to different physical devices, different virtual machines on the same physical device, a virtual machine and a non-virtualized application on the same physical device, etc.

Figure 23:
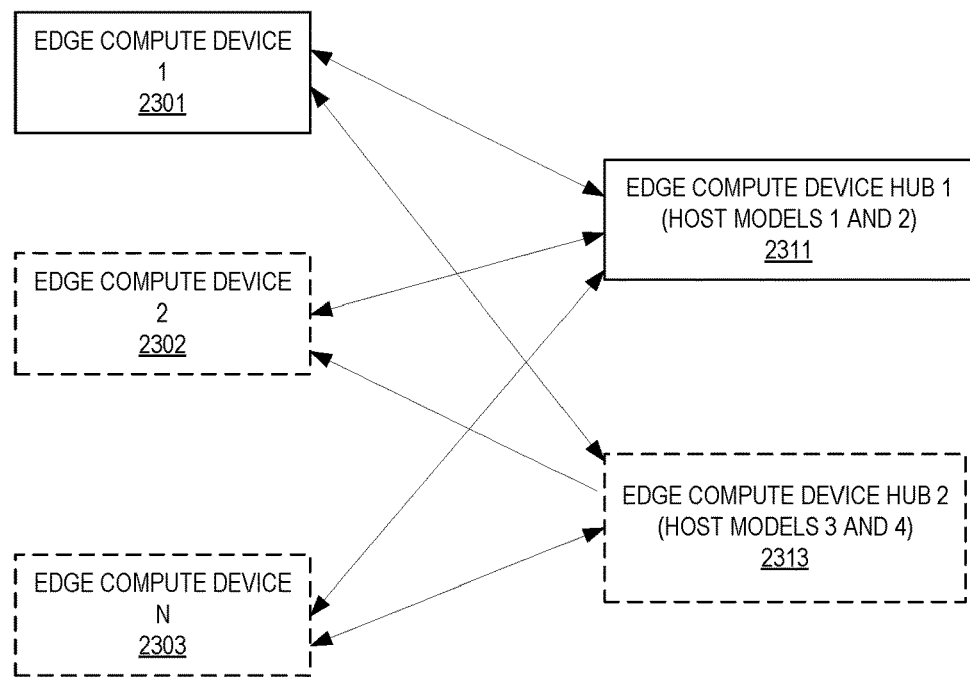
FIG. 23 illustrates examples of distributed prediction.

FIG. 23 illustrates examples of distributed prediction. As shown, edge compute device 1 2301, edge compute device 2 2302, and edge compute device N 2303 are not able to host models 1-4. Those models are instead run on either edge compute device hub 1 2311 or edge compute device hub 2 2312 which have one or more of more memory, different compute hardware, and/or different compute software. In some examples, the hubs are local to the other edge devices. Edge compute device 1 2301, edge compute device 2 2302, and edge compute device N 2303 send input tensors to the hubs and the hubs send back the output tensors after prediction.

Note that while the models in this example are split between hubs in some examples hubs have at least partial duplicative model coverage. In some examples, tensors are sent to multiple hubs and the tensors from the first hub to respond are used. In some examples, tensors are sent to multiple hubs and the tensors from the hubs are subjected to additional processing (e.g., averaging, selecting a median, etc.).

As noted above, in some examples batching may be used. Unfortunately, there may be times when batch sizes between an application and a model, or a model and another model, are different. This delta in sizes is a source of operation churns, a limitation on parallel inputs, and can cause performance bottlenecks and frame drops. Typically, this issue is either not addressed at all, or left to an application or host to handle in fragmented ways. Additionally, some models do not support batching, although the underlying hardware supports it. Examples described herein handle the issue of arbitrary sizes, lack of batch support, etc. transparently to the application and efficiently using the edge deployment manager 204.

In some examples, the edge deployment manager 204 causes samples to be fanned out onto multiple instances of the model in different processing contexts, so that each model instance is servicing a sample. This allows for batched samples from applications to be serviced concurrently (if possible) and effectively as if the model supports batching. Results from the model instances are aggregated and sent back to the application.

Figure 24:
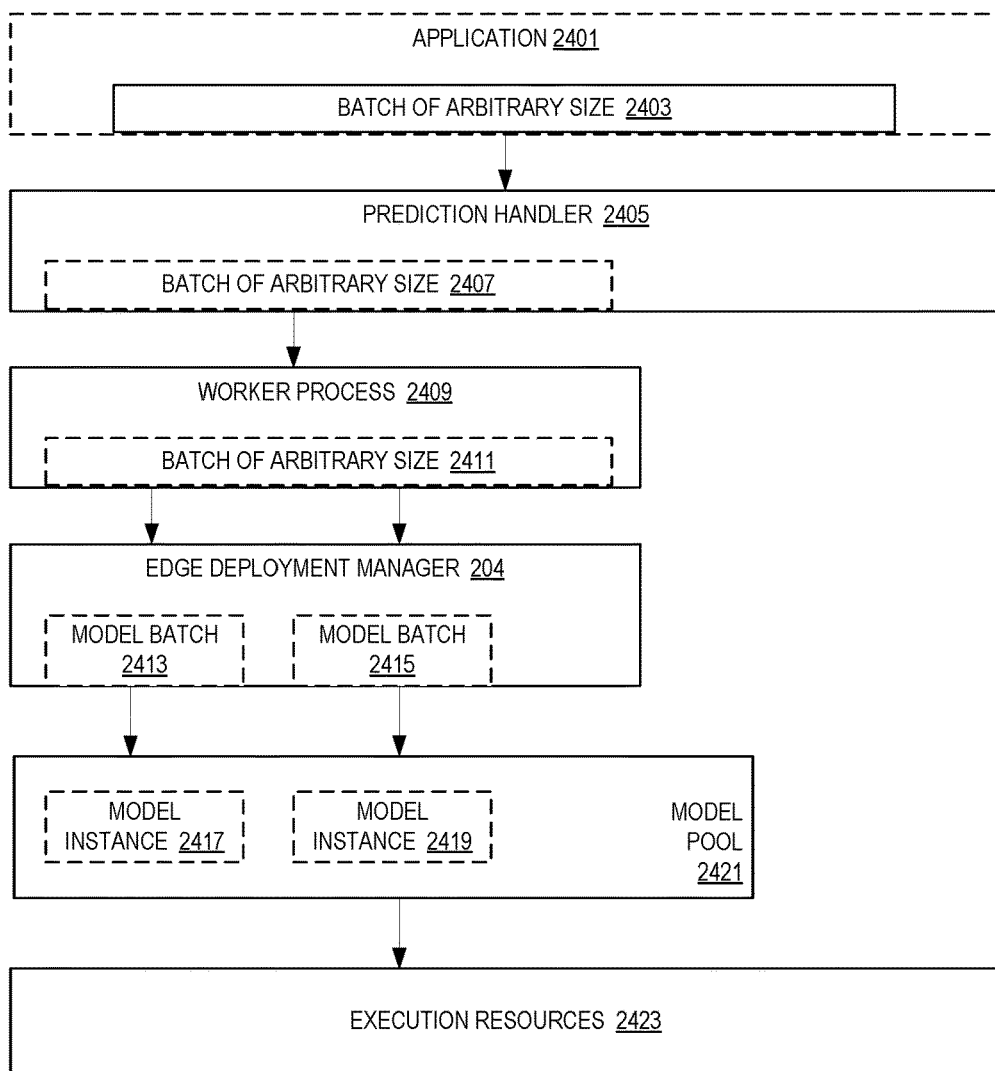
FIG. 24 illustrates examples of architectures using arbitrary (meaning potentially not the same) batch sizes.

FIG. 24 illustrates examples of architectures using arbitrary (meaning potentially not the same) batch sizes. As shown, an application 2401 can have a prediction batch of arbitrary size 2403 to store tensors. The size of a prediction batch is generally equal to the number of input tensors in a prediction API call.

A prediction handler 2405 accepts tensors from the batch 2403 of the application 2401 and has its own batch of arbitrary size 2407. In some examples, the prediction handler 2405 is one or more software modules that interface with the application 2401 to handle prediction API calls (such as software that starts a worker process).

One or more worker processes 2409, such as a pipeline process/thread, an inference process/thread, and/or a message handler, could have a batch of arbitrary size 2411 of its own.

The edge deployment manager 204 may have a batch (shown as model batches 2413 and 2415) for each model that it manages. Note that the models may have different batch sizes. Typically, the model batch size is set to be an optimal number of input tensors in a prediction for model/runtime to achieve better throughput.

The model pool 2421 comprises one or more managed model instances (shown as model instance 2417 and model instance 2419) that are to be executed on execution resources 2423.

Figure 25:
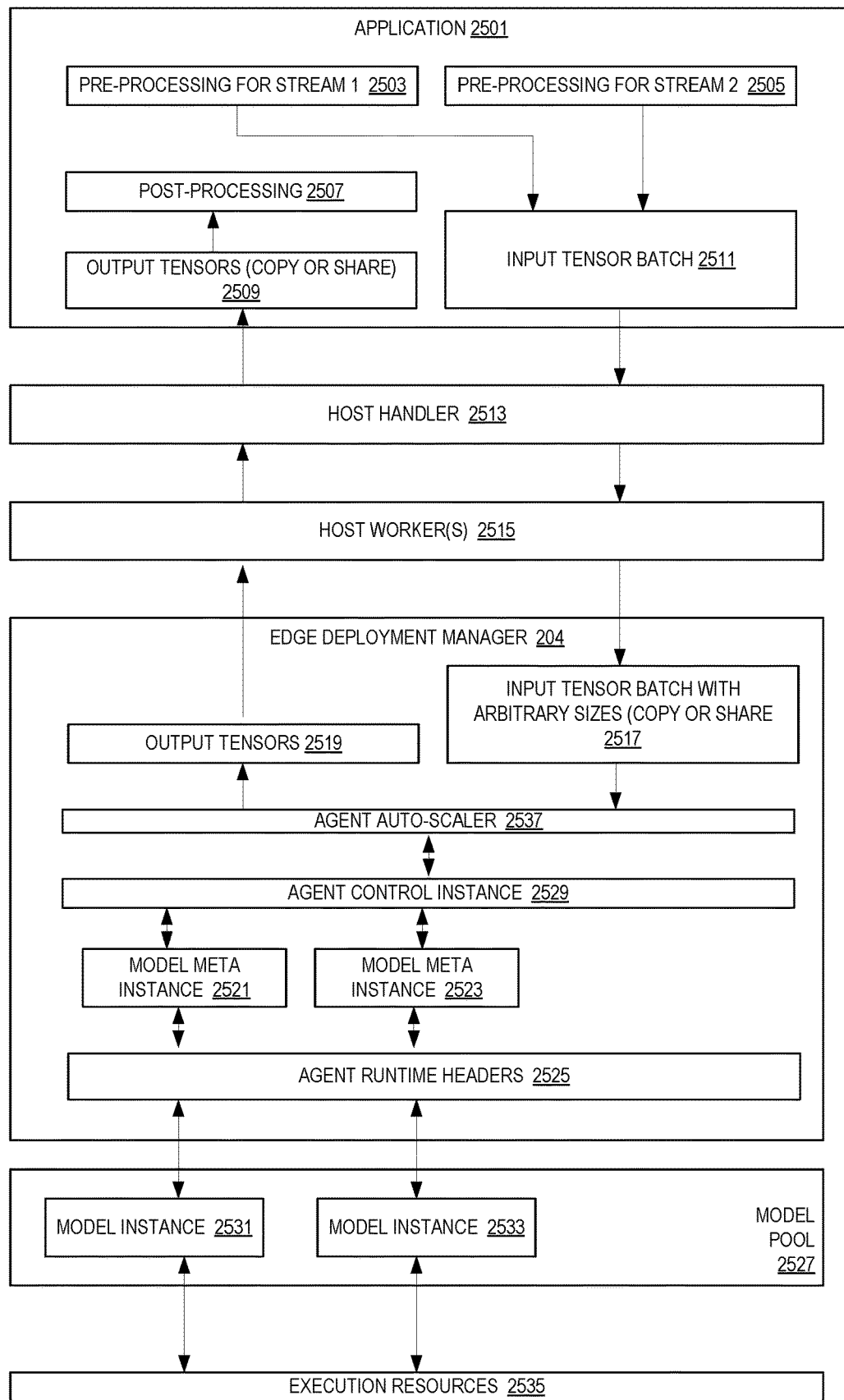
FIG. 25 illustrates examples of architectures using arbitrary (meaning potentially not the same) batch sizes.

FIG. 25 illustrates examples of architectures using arbitrary (meaning potentially not the same) batch sizes. As shown, an application 2501 utilizes two pre-processing components (pre-processing for stream 1 2503 and pre-processing for stream 2 2505) to generate input tensors to be batched using input tensor batch 2511. Note that "input" here indicates that the batched tensors may be input into a different entity. Each stream may output a different number of tensors.

A prediction (host) handler 2513 accepts tensors from the batch 2511 of the application 2501 and passes them to one or more host workers 2515 (these are host worker processes or threads as detailed in FIG. 25).

The edge deployment manager 204 is shown as receiving the input tensor batch 2511 as either a copy or share 2517. An agent auto-scaler 2537 handles auto-scaling of model instances to handle arbitrary batch sizes. An agent control instance 2529 maintains metadata for each model instance (shows as model meta instance 2521 and model meta instance 2523) and interacts with agent runtime headers 2525 which is a translation layer that matches control layer calls to runtime APIs and calls model instances. Model meta instances contain information like a handle, alias, input/output tensor detail, etc. In some examples, multiple model instances share a meta instance.

The model pool 2527 comprises one or more managed model instances (shown as model instance 2531 and model instance 2533) that are to be executed on execution resources 2435.

The edge deployment manager 204 also handles output tensors 2519. In some examples, a batched input implies offline prediction, so a default behavior for batched input is to aggregate the output tensors and return them together. However, in some examples, output tensors 2519 are returned as they come in. In some examples, to batch or not batch output tensors is a configurable parameter in the predict API call.

In some examples, the application 2501 will perform some post-processing 2507 on returned tensors.

Figure 26:
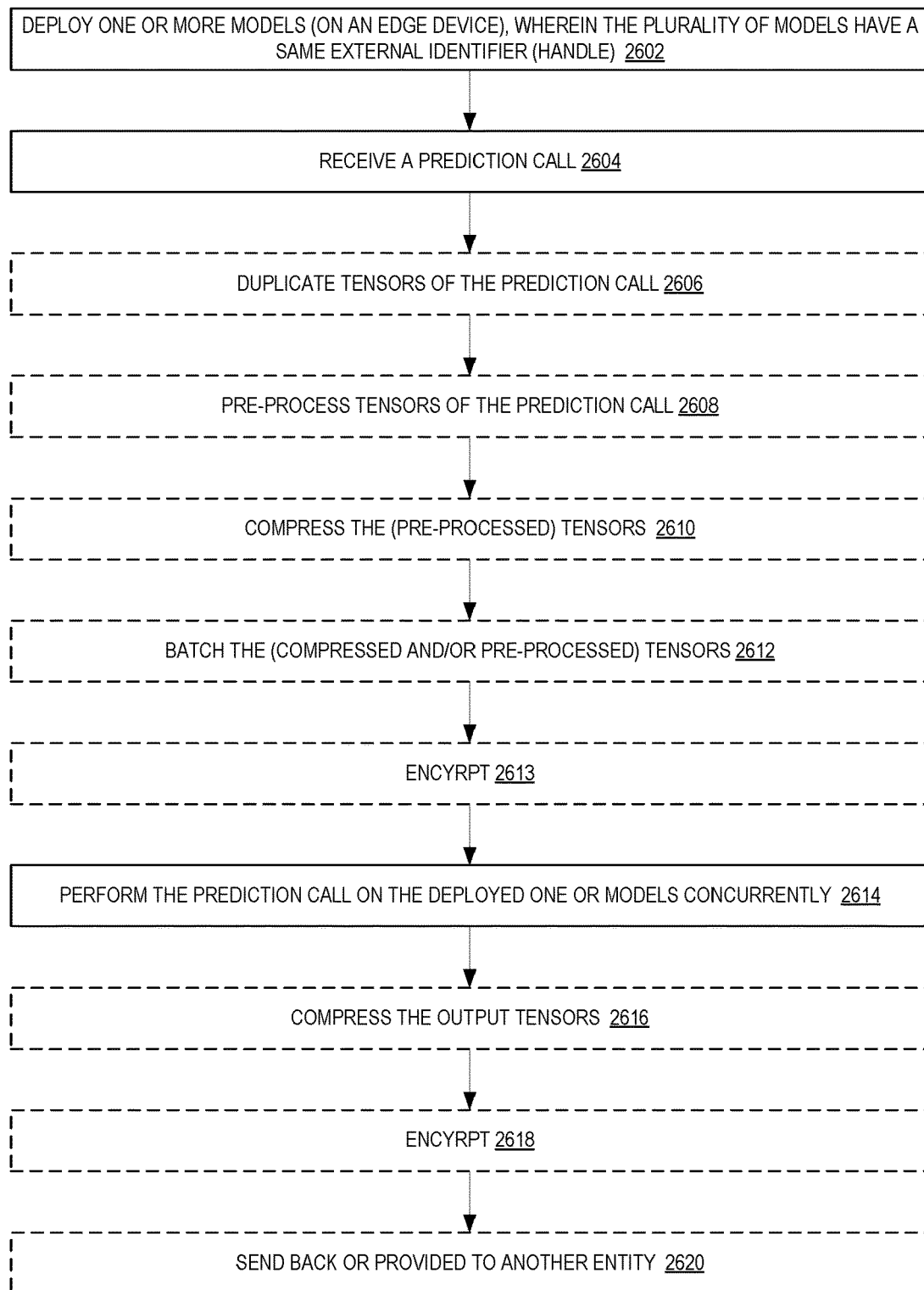
FIG. 26 is a flow diagram illustrating operations of a method for at least model pool scheduling according to some examples.

FIG. 26 is a flow diagram illustrating operations of a method for at least model pool scheduling according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the edge compute software 160, model training and packaging service 110, and/or the edge device service 112 of the other figures.

One or more models one or more edge devices, wherein the plurality of models have a same external identifier (handle) are deployed at 2602. Note that the same model may have multiple instances loaded.

A prediction call is received at 2604. Examples of such calls have been detailed above.

In some examples, tensors of the prediction call are duplicated at 2606. In some examples, tensors of the prediction call are duplicated at 2608.

In some examples, the (pre-processed) tensors are compressed at 2610. The compression could be between an application and a model, a first model and a second model, etc.

In some examples, the (compressed and/or pre-processed) tensors are batched at 2612. As noted above, the batching may be done automatically, or upon request.

In some examples, the (batched, compressed, and/or pre-processed) tensors are encrypted at 2613.

The prediction call is performed on the deployed one or models to generate output tensors at 2616. Note the prediction may include decompressing, decrypting, and/or tracking as noted below in the description of FIG. 27.

In some examples, the output tensors are compressed at 2616, and/or encrypted at 2618, and/or sent back or otherwise provided to another entity such as an application or model at 2620.

Figure 27:
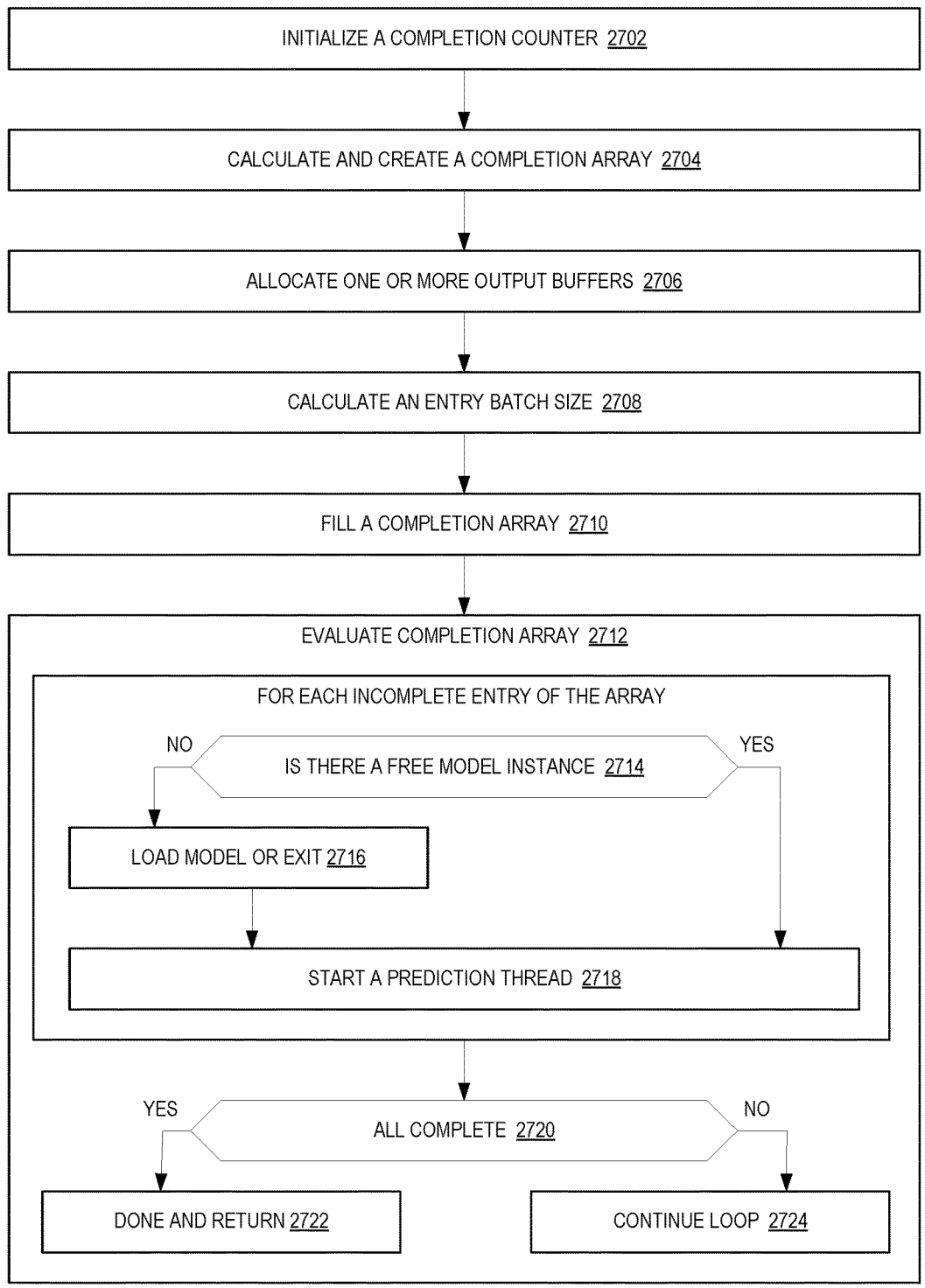
FIG. 27 is a flow diagram illustrating operations of a method for at least prediction API call handling according to some examples.

FIG. 27 is a flow diagram illustrating operations of a method for at least prediction API call handling according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the edge compute software 160, model training and packaging service 110, and/or the edge device service 112 of the other figures.

In some examples, progress of a model and/or what model(s) are in use is tracked. How this is tracked is implementation dependent, but examples of tracking include the usage of a completion data structure such as an array, queue, etc. An array allows O(1) access time of its members, and there is no need for searching, ordering, or removing/adding entries from the middle of the data structure. In some examples, if a prediction's batch size is equal to or smaller than the model's batch size, there may be no need to create a completion data structure.

In some examples, requests with more input tensors than the model's batch size will have dedicated completion arrays. This simplifies management in case multiple predictions need to be handled concurrently. Because entries are updated independently by one dedicated thread, no locking is needed.

At 2702 a completion counter for the request is initialized. This counter allows for the tracking of entries in a completion array (or other completion tracker). This counter may be polled or subjected to an interrupt. When polling a main thread from the worker reads the counter in a loop. When using interrupts dedicated threads for the entries update the counter once they are done and notifies the main thread of the change. Although the use of interrupts is more complex and harder to maintain, it can detect completeness faster than polling. For example, the main prediction thread can be blocked with locks like counting semaphores or mutex and the completeness from worker threads signaled to wake up the main thread and return. However, polling is often cheaper than its alternative and easier to maintain. As sleep timer may be used in detecting completeness per input tensor. Polling also provides retries that interrupts may not provide.

At 2704 a completion array is calculated and created. A completion array (or other data structure) includes information such as addressing information for input and output tensors, an indication of if complete, a current node, and pointers to previous and next nodes. The input tensors information will be put into its request's completion array, and each entry is marked incomplete by default. The tensors are inserted in the same order as that of the input batch. Note that the completion array allows for the restarting of a prediction API call as what tensors have not been processed or the moving of a prediction to a different machine if needed to process those tensors.

A request's completion array is allocated when the request is received on a worker with its size equal to the total number of workers needed. Each entry of the array points to the offset of that entry's input/output tensor starting addresses and stores input tensor's batch size. In some examples, an input tensor's starting address and output tensor address are calculated as follows:
input_tensor_addr=input base+index*entry_batch_size*each input_tensor_size
output tensor_addr=output base+index*entry_batch_size*each_output_tensor_size One or more output buffers are allocated at 2706.

An entry batch size is calculated at 2708. In some examples, this calculation is entry_batch_size=prediciton request's batch_size/total number of workers needed. The total number of workers needed may be calculated as follows: total-workers-needed=size of input tensors in the prediction/model batch size. A total number of model instances is determined to be a specified maximum number of instances (e.g., user provided) when total-workers-needed >specified max number of instance or is a return of total-workers-needed when that is not true.

The completion array is filled at 2710.

The completion array is evaluated at 2712. This may be done using polling or interrupts. In this example, polling is used. For each incomplete entry of the array one or more acts may be performed. In some examples, a determination of if there is a free model instance is made at 2714. When there is no free model instance, one is loaded at 2716 (or there is an exit because the processing cannot complete). When there is an instance (or one has been loaded), then a prediction thread is started at 2718. Note that decompression may be needed to predict.

A determination of if all of the tensors have been processed (e.g., is the completion array marked as being all complete) is made at 2720. If so, then the tensors are returned at 2722. If not, the loop is continued at 2724. In some examples, there is a pause before the loop is looked at again.

Figure 28:
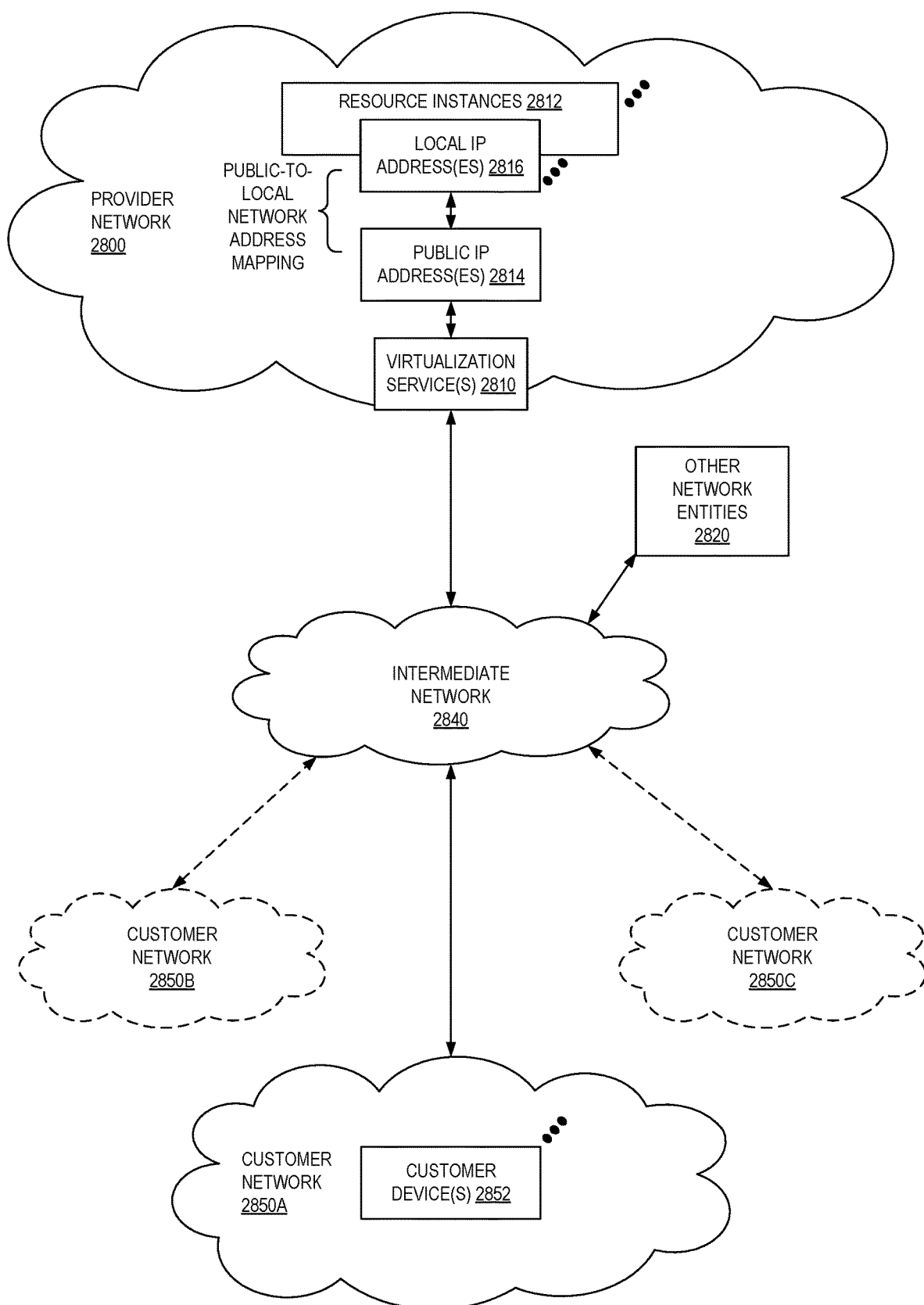
FIG. 28 illustrates an example provider network environment according to some examples.

FIG. 28 illustrates an example provider network (or "service provider system") environment according to some examples. A provider network 2800 can provide resource virtualization to customers via one or more virtualization services 2810 that allow customers to purchase, rent, or otherwise obtain instances 2812 of virtualized resources, including but not limited to computation and storage resources, implemented on devices within the provider network or networks in one or more data centers. Local Internet Protocol (IP) addresses 2816 can be associated with the resource instances 2812; the local IP addresses are the internal network addresses of the resource instances 2812 on the provider network 2800. In some examples, the provider network 2800 can also provide public IP addresses 2814 and/or public IP address ranges (e.g., Internet Protocol version 4 (IPv4) or Internet Protocol version 6 (IPv6) addresses) that customers can obtain from the provider 2800.

Conventionally, the provider network 2800, via the virtualization services 2810, can allow a customer of the service provider (e.g., a customer that operates one or more customer networks 2850A-2850C (or "client networks") including one or more customer device(s) 2852) to dynamically associate at least some public IP addresses 2814 assigned or allocated to the customer with particular resource instances 2812 assigned to the customer. The provider network 2800 can also allow the customer to remap a public IP address 2814, previously mapped to one virtualized computing resource instance 2812 allocated to the customer, to another virtualized computing resource instance 2812 that is also allocated to the customer. Using the virtualized computing resource instances 2812 and public IP addresses 2814 provided by the service provider, a customer of the service provider such as the operator of the customer network(s) 2850A-2850C can, for example, implement customer-specific applications and present the customer's applications on an intermediate network 2840, such as the Internet. Other network entities 2820 on the intermediate network 2840 can then generate traffic to a destination public IP address 2814 published by the customer network(s) 2850A-2850C; the traffic is routed to the service provider data center, and at the data center is routed, via a network substrate, to the local IP address 2816 of the virtualized computing resource instance 2812 currently mapped to the destination public IP address 2814. Similarly, response traffic from the virtualized computing resource instance 2812 can be routed via the network substrate back onto the intermediate network 2840 to the source entity 2820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 2800; a customer can then assign their allocated public IP addresses to particular resource instances allocated to the customer. These public IP addresses can be referred to as customer public IP addresses, or simply customer IP addresses. Instead of being assigned by the provider network 2800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 29:
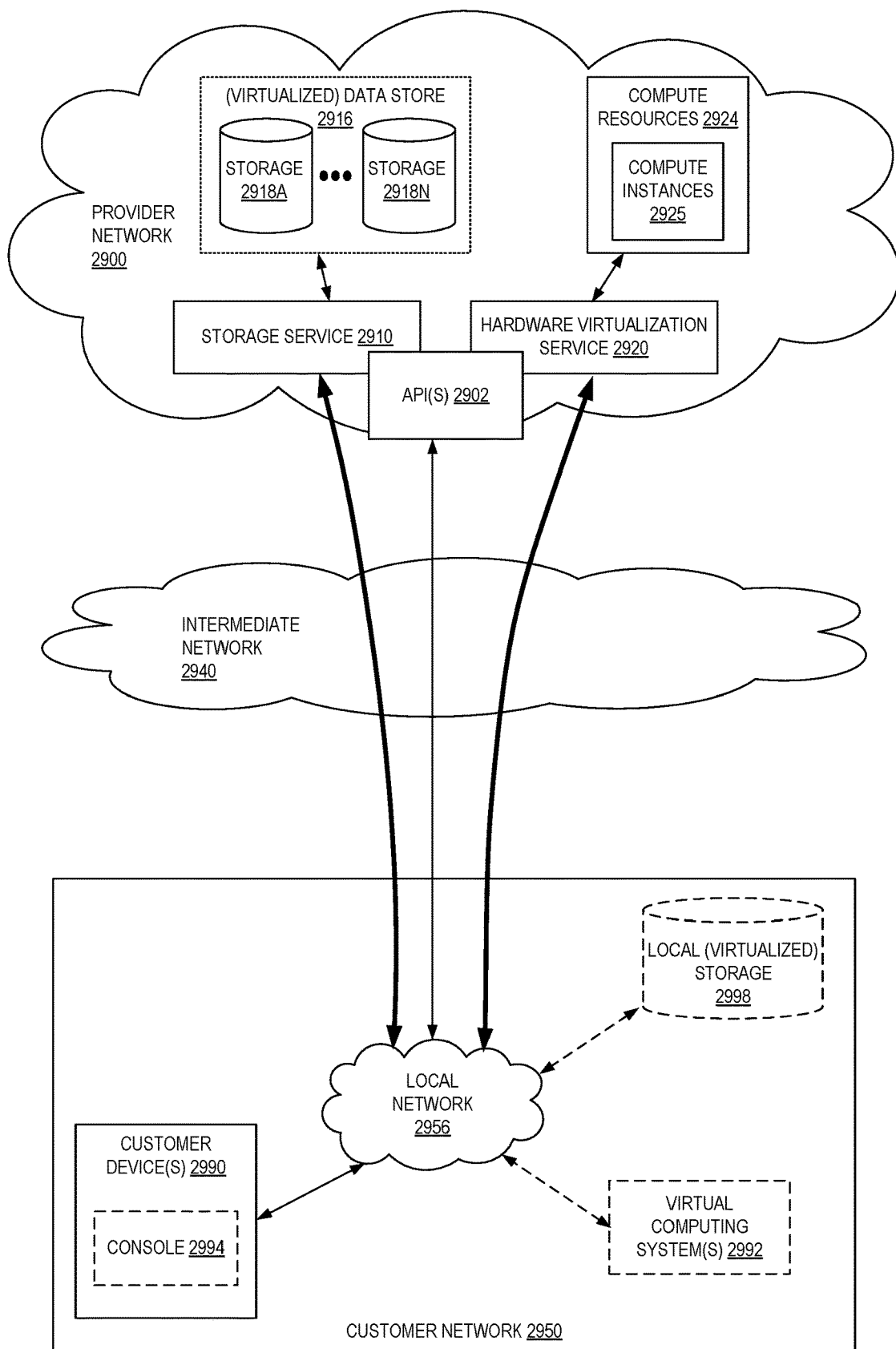
FIG. 29 is a block diagram of an example provider network that provides a storage service and a hardware virtualization service to customers according to some examples.

FIG. 29 is a block diagram of an example provider network environment that provides a storage service and a hardware virtualization service to customers, according to some examples. A hardware virtualization service 2920 provides multiple compute resources 2924 (e.g., compute instances 2925, such as VMs) to customers. The compute resources 2924 can, for example, be provided as a service to customers of a provider network 2900 (e.g., to a customer that implements a customer network 2950). Each computation resource 2924 can be provided with one or more local IP addresses. The provider network 2900 can be configured to route packets from the local IP addresses of the compute resources 2924 to public Internet destinations, and from public Internet sources to the local IP addresses of the compute resources 2924.

The provider network 2900 can provide the customer network 2950, for example coupled to an intermediate network 2940 via a local network 2956, the ability to implement virtual computing systems 2992 via the hardware virtualization service 2920 coupled to the intermediate network 2940 and to the provider network 2900. In some examples, the hardware virtualization service 2920 can provide one or more APIs 2902, for example a web services interface, via which the customer network 2950 can access functionality provided by the hardware virtualization service 2920, for example via a console 2994 (e.g., a web-based application, standalone application, mobile application, etc.) of a customer device 2990. In some examples, at the provider network 2900, each virtual computing system 2992 at the customer network 2950 can correspond to a computation resource 2924 that is leased, rented, or otherwise provided to the customer network 2950.

From an instance of the virtual computing system(s) 2992 and/or another customer device 2990 (e.g., via console 2994), the customer can access the functionality of a storage service 2910, for example via the one or more APIs 2902, to access data from and store data to storage resources 2918A-2918N of a virtual data store 2916 (e.g., a folder or "bucket," a virtualized volume, a database, etc.) provided by the provider network 2900. In some examples, a virtualized data store gateway (not shown) can be provided at the customer network 2950 that can locally cache at least some data, for example frequently accessed or critical data, and that can communicate with the storage service 2910 via one or more communications channels to upload new or modified data from a local cache so that the primary store of data (the virtualized data store 2916) is maintained. In some examples, a user, via the virtual computing system 2992 and/or another customer device 2990, can mount and access virtual data store 2916 volumes via the storage service 2910 acting as a storage virtualization service, and these volumes can appear to the user as local (virtualized) storage 2998.

While not shown in FIG. 29, the virtualization service(s) can also be accessed from resource instances within the provider network 2900 via the API(s) 2902. For example, a customer, appliance service provider, or other entity can access a virtualization service from within a respective virtual network on the provider network 2900 via the API(s) 2902 to request allocation of one or more resource instances within the virtual network or within another virtual network.

Illustrative Systems

Figure 30:
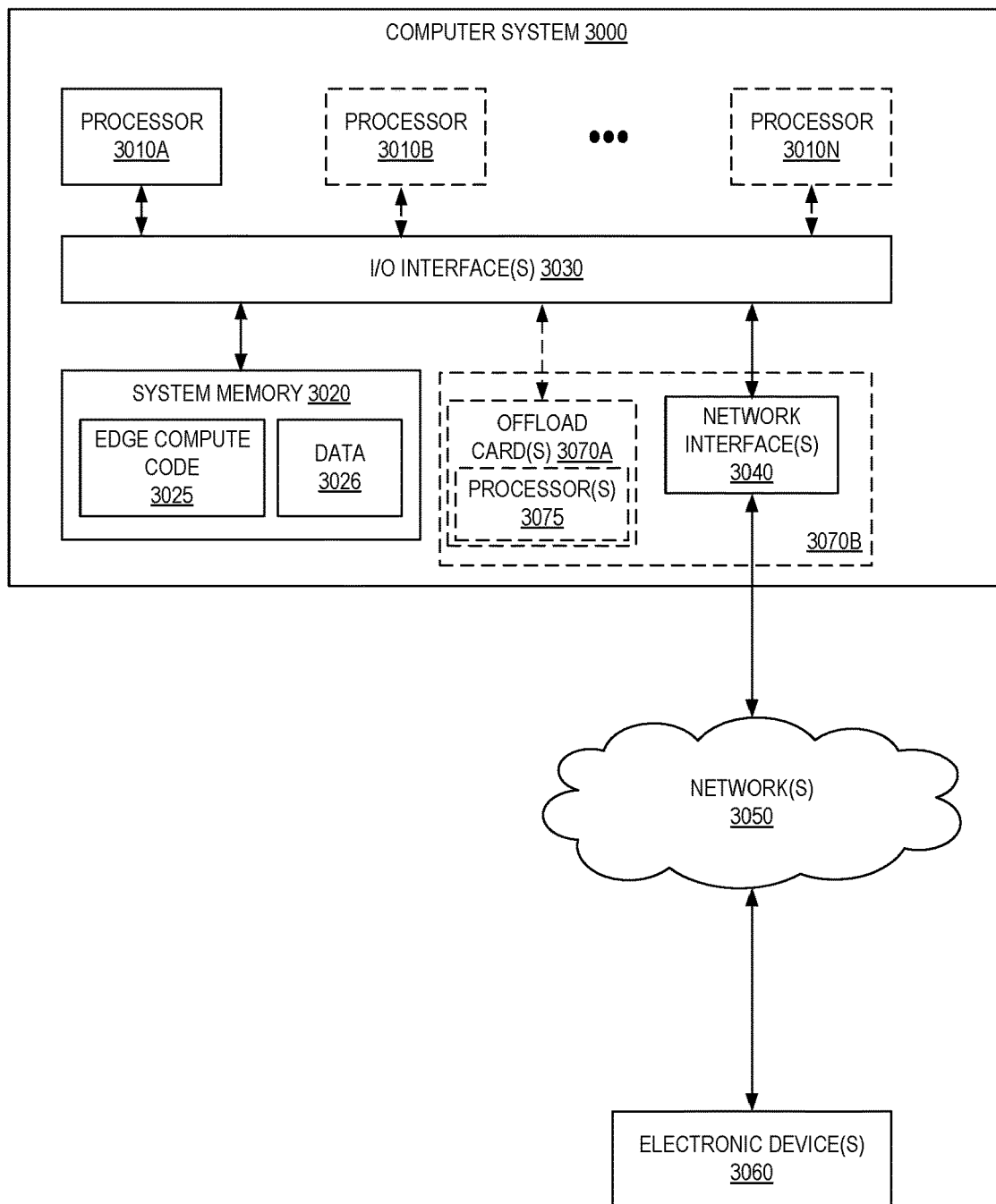
FIG. 30 is a block diagram illustrating an example computer system that can be used in some examples.

In some examples, a system that implements a portion or all of the techniques described herein can include a general-purpose computer system, such as the computer system 3000 illustrated in FIG. 30, that includes, or is configured to access, one or more computer-accessible media. In the illustrated example, the computer system 3000 includes one or more processors 3010 coupled to a system memory 3020 via an input/output (I/O) interface 3030. The computer system 3000 further includes a network interface 3040 coupled to the I/O interface 3030. While FIG. 30 shows the computer system 3000 as a single computing device, in various examples the computer system 3000 can include one computing device or any number of computing devices configured to work together as a single computer system 3000.

In various examples, the computer system 3000 can be a uniprocessor system including one processor 3010, or a multiprocessor system including several processors 3010 (e.g., two, four, eight, or another suitable number). The processor(s) 3010 can be any suitable processor(s) capable of executing instructions. For example, in various examples, the processor(s) 3010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 3010 can commonly, but not necessarily, implement the same ISA.

The system memory 3020 can store instructions and data accessible by the processor(s) 3010. In various examples, the system memory 3020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 3020 as edge compute code 3025 (e.g., executable to implement, in whole or in part, the edge compute software 160) and data 3026.

In some examples, the I/O interface 3030 can be configured to coordinate I/O traffic between the processor 3010, the system memory 3020, and any peripheral devices in the device, including the network interface 3040 and/or other peripheral interfaces (not shown). In some examples, the I/O interface 3030 can perform any necessary protocol, timing, or other data transformations to convert data signals from one component (e.g., the system memory 3020) into a format suitable for use by another component (e.g., the processor 3010). In some examples, the I/O interface 3030 can include support for devices attached through various types of peripheral buses, such as a variant of the Peripheral Component Interconnect (PCI) bus standard or the Universal Serial Bus (USB) standard, for example. In some examples, the function of the I/O interface 3030 can be split into two or more separate components, such as a north bridge and a south bridge, for example. Also, in some examples, some or all of the functionality of the I/O interface 3030, such as an interface to the system memory 3020, can be incorporated directly into the processor 3010.

The network interface 3040 can be configured to allow data to be exchanged between the computer system 3000 and other devices 3060 attached to a network or networks 3050, such as other computer systems or devices as illustrated in FIG. 1, for example. In various examples, the network interface 3040 can support communication via any suitable wired or wireless general data networks, such as types of Ethernet network, for example. Additionally, the network interface 3040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 3000 includes one or more offload cards 3070A or 3070B (including one or more processors 3075, and possibly including the one or more network interfaces 3040) that are connected using the I/O interface 3030 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 3000 can act as a host electronic device (e.g., operating as part of a hardware virtualization service) that hosts compute resources such as compute instances, and the one or more offload cards 3070A or 3070B execute a virtualization manager that can manage compute instances that execute on the host electronic device. As an example, in some examples the offload card(s) 3070A or 3070B can perform compute instance management operations, such as pausing and/or un-pausing compute instances, launching and/or terminating compute instances, performing memory transfer/copying operations, etc. These management operations can, in some examples, be performed by the offload card(s) 3070A or 3070B in coordination with a hypervisor (e.g., upon a request from a hypervisor) that is executed by the other processors 3010A-3010N of the computer system 3000. However, in some examples the virtualization manager implemented by the offload card(s) 3070A or 3070B can accommodate requests from other entities (e.g., from compute instances themselves), and can not coordinate with (or service) any separate hypervisor.

In some examples, the system memory 3020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 3000 via the I/O interface 3030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 3000 as the system memory 3020 or another type of memory. Further, a computer-accessible medium can include transmission media or signals such as electrical, electromagnetic, or digital signals, conveyed via a communication medium such as a network and/or a wireless link, such as can be implemented via the network interface 3040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

At least some examples of the disclosed technologies can be described in view of the following examples:

1. A computer-implemented method comprising:
   receiving a request to load a first machine learning model into a model pool of an edge device, wherein the request includes an external identifier of the machine learning model that identifies the model pool; and loading at least one instance the model onto the edge device, wherein the machine learning model is loaded into a model pool having at least a second model using the external identifier and each of the first and second models have different internal aliases.

2. The computer-implemented method of example 1, wherein the first loaded model is an update of the second model wherein only weights of the models are different.

3. The computer-implemented method of example 1, wherein the request includes one or more of an identification of a model handle, an identification of a model alias, an indication of a location of a model and/or its runtime, an indication of input and/or output buffer sizes, an indication of a desired execution environment, and an indication of a number of instances to load.

4. A computer-implemented method comprising:
receiving a request to load a first machine learning model on an edge device, wherein the request includes an external identifier of the machine learning model; and
loading at least one instance the model onto the edge device, wherein the machine learning model is loaded into a model pool having at least a second model using the external identifier.

5. The computer-implemented method of example 4, wherein the first loaded model is an update of the second model wherein only weights of the models are different.

6. The computer-implemented method of example 4, wherein the first loaded model has a different architecture than the second model.

7. The computer-implemented method of example 4, further comprising:
receiving data from at least one application to use in a prediction using the first model according to a prediction request, wherein the prediction request identifies the external identifier and not an internal identifier; and
performing inference using the first model.

8. The computer-implemented method of example 4, further comprising:
receiving data from at least one application to use in a prediction using the first model according to a prediction request, wherein the prediction request identifies the external identifier and not an internal identifier;
pre-processing the data to fit the first model; and
performing inference using the first model.

9. The computer-implemented method of example 4, further comprising:
unloading the second model upon loading the first model.

10. The computer-implemented method of example 4, wherein the request includes one or more of an identification of a model handle, an identification of a model alias, an indication of a location of a model and/or its runtime, an indication of input and/or output buffer sizes, an indication of a desired execution environment, and an indication of a number of instances to load.

11. The computer-implemented method of example 4, wherein return status codes for the request include at least one of load is successful, an unknown error has occurred, an internal error has occurred, the model does not exist, the model already exists, memory is not available to load the model, or the model is not compiled for the machine.

12. The computer-implemented method of example 4, further comprising:
batching tensor data to be used by the first model during inferencing.

13. The computer-implemented method of example 4, further comprising:
performing inference using the first model and the second model.

14. The computer-implemented method of example 4, wherein the request to load a first machine learning model on an edge device is received by a provider network to invoke loading on the edge device.

15. A system comprising:
a first one or more electronic devices to implement an edge device service in a multi-tenant provider network; and
a second one or more electronic devices to implement edge compute software on an edge device, the edge compute software including instructions that upon execution cause to:
receive a request from the edge device service to load a first machine learning model on the edge device, wherein the request includes an external identifier of the machine learning model; and
load at least one instance the model onto the edge device, wherein the machine learning model is loaded into a model pool having at least a second model using the external identifier.

16. The system of example 15, wherein the request includes one or more of: an identification of a model handle, an identification of a model alias, an indication of a location of a model and/or its runtime, an indication of input and/or output buffer sizes, an indication of a desired execution environment, and an indication of a number of instances to load.

17. The system of example 15, wherein the first loaded model is an update of the second model wherein only weights of the models are different.

18. The system of example 15, wherein the first loaded model has a different architecture than the second model.

19. The system of example 15, wherein return status codes for the request include at least one of load is successful, an unknown error has occurred, an internal error has occurred, the model does not exist, the model already exists, memory is not available to load the model, or the model is not compiled for the machine.

20. The system of example 15, wherein the edge compute software is further to perform inference using the first model and the second model.

21. A computer-implemented method comprising:
receiving a prediction request, the prediction request at least including an indication of a handle shared by a plurality of models of an edge device, wherein the plurality of models each has a different internal alias;
duplicating at least one input tensor of the prediction request;
performing the prediction request on the deployed plurality of models sharing the handle concurrently using the duplicated at least one input tensor of the prediction request; and
capturing a result from each of the deployed plurality of models sharing the handle and associating the result with an alias.

22. The computer-implemented method of example 21, wherein the prediction request includes a handle, but no aliases.

23. The computer-implemented method of example 21, wherein the prediction request includes a handle and at least two aliases.

24. A computer-implemented method comprising:
receiving a prediction request, the prediction request at least including an indication of a handle shared by a plurality of models of an edge device;
performing the prediction request on the deployed plurality of models sharing the handle concurrently; and
capturing a result from each of the deployed plurality of models sharing the handle.

25. The computer-implemented method of example 24, wherein each of the deployed models utilizes a different alias.

26. The computer-implemented method of example 24, further comprising:
deploying the plurality of models on the edge device.

27. The computer-implemented method of example 24, further comprising:
retraining based on the captured results.

28. The computer-implemented method of example 24, wherein the prediction request includes a handle, but no aliases.

29. The computer-implemented method of example 24, wherein the prediction request includes a handle and at least two aliases.

30. The computer-implemented method of example 24, further comprising:
duplicating tensors of the prediction request.

31. The computer-implemented method of example 24, further comprising:
pre-processing tensors of the predication request to fit each of the plurality of models.

32. The computer-implemented method of example 22, wherein a shape of the tensors is determined from the plurality of models.

33. The computer-implemented method of example 24, wherein the prediction request is from an application.

34. The computer-implemented method of example 24, wherein the prediction request identifies input tensors encoded as an array.

35. The computer-implemented method of example 24, further comprising:
selecting and unloading a model based on captured results.

36. A system comprising:
a first one or more electronic devices to implement a XXX service in a multi-tenant provider network; and
a second one or more electronic devices to implement edge compute software, the edge compute software including instructions that upon execution cause the edge compute software to:
receive a prediction request, the prediction request at least including an indication of a handle shared by a plurality of models of an edge device;
perform the prediction request on the deployed plurality of models sharing the handle concurrently; and
capture a result from each of the deployed plurality of models sharing the handle.

37. The system of example 36, wherein the prediction request is from an application.

38. The system of example 36, wherein the prediction request includes a handle, but no aliases.

39. The system of example 36, wherein the prediction request includes a handle and at least two aliases.

40. The system of example 36, wherein each of the deployed models utilizes a different alias.

41. A computer-implemented method comprising:
loading a plurality of models into a model stored on an edge device;
receiving a prediction request for a model of model pool stored on an edge device, wherein the prediction request is to at least identify an external handle shared by all models of the model pool;
mapping the prediction request to at least one model of the model pool based on the external handle; and performing inference using that mapped at least one model of the model pool.

42. The computer-implemented method of example 41, wherein a runtime is shared between the models of the model pool.

43. The computer-implemented method of example 41, wherein inference using that mapped at least one model of the model pool is performed using one or more of a graphics processing unit, a central processing unit, a tensor core, an application specific integrated circuit, or a field programmable gate array.

44. A computer-implemented method comprising:
receiving a prediction request for a model of a model pool stored on an edge device, wherein the prediction request is to at least identify an external handle shared by all models of the model pool;
mapping the prediction request to at least one model of the model pool; and
performing inference using that mapped at least one model of the model pool.

45. The computer-implemented method of example 44, wherein the at least one model of the model pool and its runtime support concurrency and multiple prediction requests use a single instance of the at least one model of the model pool.

46. The computer-implemented method of example 44, wherein the multiple prediction requests are batched.

47. The computer-implemented method of example 44, wherein a runtime is shared between the models of the model pool.

48. The computer-implemented method of example 44, wherein each model of the model pool has its own runtime.

49. The computer-implemented method of example 44, further comprising:
loading multiple instances of the at least one model of the model pool as indicated by a load model request.

50. The computer-implemented method of example 44, wherein mapping the prediction request to at least one model of the model pool comprises interleaving prediction requests to be performed on the at least one model of the model pool.

51. The computer-implemented method of example 44, wherein mapping the prediction request to at least one model of the model pool comprises overlapping prediction requests to be performed on different threads of execution hardware of the edge device.

52. The computer-implemented method of example 44, wherein mapping the prediction request to at least one model of the model pool comprises mapping to a free preloaded model of the model pool.

53. The computer-implemented method of example 44, wherein inference using that mapped at least one model of the model pool is performed using one or more of a graphics processing unit, a central processing unit, a tensor core, an application specific integrated circuit, or a field programmable gate array.

54. The computer-implemented method of example 44, wherein inference using that mapped at least one model of the model pool is performed using a multicore central processing unit.

55. A system comprising:
a first one or more electronic devices to implement an edge device service in a multi-tenant provider network; and
a second one or more electronic devices to implement edge compute software, the edge compute software service including instructions that upon execution cause the edge compute software to:
receive a prediction request from the edge device service for a model of a model pool stored on an edge device, wherein the prediction request is to at least identify an external handle shared by all models of the model pool;
map the prediction request to at least one model of the model pool; and
perform inference using that mapped at least one model of the model pool.
56. The system of example 55, wherein the at least one model of the model pool and its runtime support concurrency and multiple prediction requests use a single instance of the at least one model of the model pool.
57. The system of example 56, wherein the multiple prediction requests are batched.
58. The system of example 55, wherein a runtime is shared between the models of the model pool.
59. The system of example 55, wherein each model of the model pool has its own runtime.
60. The system of example 55, wherein inference using that mapped at least one model of the model pool is performed using one or more of a graphics processing unit, a central processing unit, a tensor core, an application specific integrated circuit, or a field programmable gate array The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving a request to load a first machine learning (ML) model into a ML model pool of an edge device, wherein the request includes an external identifier of the first ML model that identifies the ML model pool;
in response to the request, the edge device executing edge compute code using one or more processors to load at least one instance of the first ML model into the ML model pool of the edge device, wherein the ML model pool has at least a second ML model using the external identifier and each of the first and second ML models have different internal aliases; and
a runtime orchestrator executed by the one or more processors of the edge device handling translation of prediction requests to a model layer to underlying runtime application programming interfaces (APIs).

2. The computer-implemented method of claim 1, wherein the first ML model is an update of the second ML model wherein only weights of the ML models are different.

3. The computer-implemented method of claim 1, wherein the request includes one or more of: an identification of a model handle, an identification of a model alias, an indication of a location of a model and/or its runtime, an indication of input and/or output buffer sizes, an indication of a desired execution environment, and an indication of a number of instances to load.

4. A computer-implemented method comprising:
receiving a request to load a first machine learning (ML) model on an edge device, wherein the request includes an external identifier of the first ML model;
in response to the request, the edge device executing edge compute code using one or more processors to load at least one instance of the first ML model onto the edge device, wherein the first ML model is loaded into a ML model pool having at least a second ML model using the external identifier and each of the first and second ML models have different internal aliases; and
a runtime orchestrator executed by the one or more processors of the edge device handling translation of prediction requests to a model layer to underlying runtime application programming interfaces (APIs).

5. The computer-implemented method of claim 4, wherein the first ML model is an update of the second ML model wherein only weights of the ML models are different.

6. The computer-implemented method of claim 4, wherein the first ML model has a different architecture than the second ML model.

7. The computer-implemented method of claim 4, further comprising:
receiving data from at least one application to use in a prediction using the first ML model according to a prediction request, wherein the prediction request identifies the external identifier and not the internal alias of the first ML model; and
performing inference using the first ML model.

8. The computer-implemented method of claim 4, further comprising:
receiving data from at least one application to use in a prediction using the first ML model according to a prediction request, wherein the prediction request identifies the external identifier and not the internal alias of the first ML model;
pre-processing the data to fit the first ML model; and
performing inference using the first ML model.

9. The computer-implemented method of claim 4, further comprising unloading the second ML model upon loading the first ML model.

10. The computer-implemented method of claim 4, wherein the request includes one or more of: an identification of a model handle, an identification of a model alias, an indication of a location of a model and/or its runtime, an indication of input and/or output buffer sizes, an indication of a desired execution environment, and an indication of a number of instances to load.

11. The computer-implemented method of claim 4, wherein return status codes for the request include at least one of load is successful, an unknown error has occurred, an internal error has occurred, the first ML model does not exist, the first ML model already exists, memory is not available to load the first ML model, or the first ML model is not compiled for the machine.

12. The computer-implemented method of claim 4, further comprising batching tensor data to be used by the first ML model during inferencing.

13. The computer-implemented method of claim 4, further comprising performing inference using the first ML model and the second ML model.

14. The computer-implemented method of claim 4, wherein the request to load the first ML model on the edge device is received by a provider network to invoke loading on the edge device.

15. A system comprising:
a first one or more electronic devices to implement an edge device service in a multi-tenant provider network; and
a second one or more electronic devices to implement edge compute software on an edge device, the edge compute software including instructions that upon execution by one or more processors cause the edge device to:
receive a request from the edge device service to load a first machine learning (ML) model on the edge device, wherein the request includes an external identifier of the first ML model;
in response to the request, execute the edge compute software to load at least one instance of the first ML model onto the edge device, wherein the first ML model is loaded into a ML model pool having at least a second ML model using the external identifier and each of the first and second ML models have different internal aliases; and
a runtime orchestrator executed by the one or more processors of the edge device handling translation of prediction requests to a model layer to underlying runtime application programming interfaces (APIs).

16. The system of claim 15, wherein the request includes one or more of: an identification of a model handle, an identification of a model alias, an indication of a location of a model and/or its runtime, an indication of input and/or output buffer sizes, an indication of a desired execution environment, and an indication of a number of instances to load.

17. The system of claim 15, wherein the first ML model is an update of the second ML model wherein only weights of the ML models are different.

18. The system of claim 15, wherein the first ML model has a different architecture than the second ML model.

19. The system of claim 15, wherein return status codes for the request include at least one of load is successful, an unknown error has occurred, an internal error has occurred, the first ML model does not exist, the first ML model already exists, memory is not available to load the first ML model, or the first ML model is not compiled for the machine.

20. The system of claim 15, wherein the edge compute software includes further instructions that upon execution by the one or more processors further cause the edge device to perform inference using the first ML model and the second ML model.

* * * * *